US012027017B2

(12) United States Patent
Tsombanidis et al.

(10) Patent No.: US 12,027,017 B2
(45) Date of Patent: Jul. 2, 2024

(54) GAMING MACHINE AND METHOD USING LINKED VALUE-BEARING SYMBOLS

(71) Applicant: LNW Gaming, Inc., Las Vegas, NV (US)

(72) Inventors: Yanis Tsombanidis, Las Vegas, NV (US); Jack Chesworth, Newtown (AU)

(73) Assignee: LNW Gaming, Inc., Las Vegas, NV (US)

( * ) Notice: Subject to any disclaimer, the term of this patent is extended or adjusted under 35 U.S.C. 154(b) by 144 days.

(21) Appl. No.: 17/744,818

(22) Filed: May 16, 2022

(65) Prior Publication Data

US 2023/0368615 A1 Nov. 16, 2023

(51) Int. Cl.
*G07F 17/00* (2006.01)
*G07F 17/32* (2006.01)

(52) U.S. Cl.
CPC ...... *G07F 17/3267* (2013.01); *G07F 17/3213* (2013.01); *G07F 17/3244* (2013.01)

(58) Field of Classification Search
None
See application file for complete search history.

(56) References Cited

U.S. PATENT DOCUMENTS 3,733,075 A 5/1973 Hooker et al.
4,198,052 A 4/1980 Gauselmann
4,732,386 A 3/1988 Rayfiel
4,733,075 A 3/1988 Sato
5,100,137 A 3/1992 Fulton
(Continued)

FOREIGN PATENT DOCUMENTS

AU 2013251288 A1 5/2014
AU 2014202042 A1 5/2014
(Continued)

OTHER PUBLICATIONS

Legato, Frank, "Aristocrat Gaming", Global Gaming Business Magazine, Sep. 27, 2021, retrieved from: https://ggbmagazine.com/article/aristocrat-gaming-2/, 14 pages.
(Continued)

*Primary Examiner* — James S. McClellan
*Assistant Examiner* — Jeffrey K Wong

(57) ABSTRACT

A gaming system comprises a presentation assembly presenting a plurality of symbol positions and game-logic circuitry configured to cause the presentation assembly to associate, in response to an activation event, a first symbol position with an award region and present a subsequent game outcome by populating the symbol positions with randomly selected symbols. The game-logic circuitry detects whether or not a symbol of a linked symbol group including value-bearing symbols with respective positions within the linked symbol group and award indicia visibly indicating corresponding award values occupies the award region in the subsequent game outcome. The game-logic circuitry causes, in response to detecting a first value-bearing symbol occupying the award region, the presentation assembly to provide an award for the award values of at least one value-bearing symbol within the linked symbol group based on the position of the first value-bearing symbol relative to the positions of other value-bearing symbols.

21 Claims, 17 Drawing Sheets

(56) References Cited

U.S. PATENT DOCUMENTS 5,152,529 A 10/1992 Okada
5,205,555 A 4/1993 Hamano
5,342,047 A 8/1994 Heidel et al.
5,356,140 A 10/1994 Dabrowski et al.
5,393,057 A 2/1995 Marnell, II
5,393,061 A 2/1995 Manship et al.
5,395,111 A 3/1995 Inoue
5,431,408 A 7/1995 Adams
5,511,781 A 4/1996 Wood et al.
5,618,232 A 4/1997 Martin
5,695,188 A 12/1997 Ishibashi
5,704,835 A 1/1998 Dietz
5,722,891 A 3/1998 Inoue
5,752,881 A 5/1998 Inoue
5,766,074 A 6/1998 Cannon et al.
5,788,573 A 8/1998 Baerlocher et al.
5,807,177 A 9/1998 Takemoto et al.
5,810,665 A 9/1998 Takemoto et al.
5,833,537 A 11/1998 Barrie
5,848,932 A 12/1998 Adams
5,855,515 A 1/1999 Pease et al.
5,876,284 A 3/1999 Acres et al.
5,882,259 A 3/1999 Holmes, Jr. et al.
5,882,261 A 3/1999 Adams
5,890,962 A 4/1999 Takemoto
5,911,418 A 6/1999 Adams
5,947,820 A 9/1999 Morro et al.
5,951,397 A 9/1999 Dickinson
5,988,638 A 11/1999 Rodesch et al.
6,027,115 A 2/2000 Griswold et al.
6,033,307 A 3/2000 Vancura
6,048,269 A 4/2000 Burns et al.
6,050,895 A 4/2000 Luciano, Jr. et al.
6,056,642 A 5/2000 Bennett
6,068,553 A 5/2000 Parker
6,089,976 A 7/2000 Schneider et al.
6,089,977 A 7/2000 Bennett
6,102,798 A 8/2000 Bennett
6,120,031 A 9/2000 Adams
6,142,873 A 11/2000 Weiss et al.
6,159,097 A 12/2000 Gura
6,162,121 A 12/2000 Morro et al.
6,168,520 B1 1/2001 Baerlocher et al.
6,186,894 B1 * 2/2001 Mayeroff ................ G07F 17/34 463/16
6,203,429 B1 3/2001 Demar et al.
6,213,875 B1 4/2001 Suzuki
6,224,482 B1 5/2001 Bennett
6,224,483 B1 5/2001 Mayeroff
6,224,484 B1 5/2001 Okuda et al.
6,227,971 B1 5/2001 Weiss
6,241,607 B1 6/2001 Payne et al.
6,251,013 B1 6/2001 Bennett
6,270,411 B1 8/2001 Gura et al.
6,270,412 B1 8/2001 Crawford et al.
6,290,600 B1 9/2001 Glasson
6,309,300 B1 10/2001 Glavich
6,319,124 B1 11/2001 Baerlocher et al.
6,375,567 B1 4/2002 Acres
6,375,570 B1 4/2002 Poole
6,413,162 B1 7/2002 Baerlocher et al.
6,481,713 B2 11/2002 Perrie et al.
6,517,432 B1 2/2003 Jaffe
6,537,150 B1 3/2003 Luciano et al.
6,544,120 B2 4/2003 Ainsworth
6,547,242 B1 4/2003 Sugiyama et al.
6,551,187 B1 4/2003 Jaffe
6,554,704 B2 4/2003 Nicastro et al.
6,558,254 B2 5/2003 Baelocher et al.
6,561,900 B1 5/2003 Baerlocher et al.
6,565,434 B1 5/2003 Acres
6,641,477 B1 11/2003 Dietz
6,652,378 B2 11/2003 Cannon et al.
6,656,040 B1 12/2003 Brosnan et al.
6,657,923 B2 12/2003 Laughlin
6,692,356 B2 2/2004 Baerlocher et al.
6,702,675 B2 3/2004 Poole et al.
6,731,313 B1 5/2004 Kaminkow
6,786,818 B1 9/2004 Rothschild et al.
6,832,957 B2 12/2004 Falconer
6,837,790 B1 1/2005 Kaminkow
6,869,360 B2 3/2005 Marks et al.
6,896,617 B2 5/2005 Daly
6,910,962 B2 6/2005 Marks et al.
6,916,243 B2 7/2005 Yoshida
6,918,834 B2 7/2005 Vancura
6,926,609 B2 8/2005 Martin
6,960,134 B2 11/2005 Hartl et al.
7,018,293 B2 3/2006 Brown et al.
7,029,395 B1 4/2006 Baerlocher
7,029,396 B2 4/2006 Jaffe et al.
7,121,945 B2 10/2006 Suganuma et al.
7,156,740 B2 1/2007 Kaminkow
7,179,169 B2 2/2007 Beaulieu et al.
7,252,591 B2 8/2007 Van Asdale
7,316,613 B2 1/2008 Luccesi et al.
7,326,113 B2 2/2008 Bennett et al.
7,371,170 B2 5/2008 Cregan et al.
7,377,850 B2 5/2008 Shackelford et al.
7,452,276 B2 11/2008 Loose et al.
7,458,890 B2 12/2008 Loose et al.
7,488,252 B2 2/2009 Griswold et al.
7,503,847 B2 3/2009 Baerlocher
7,526,736 B2 4/2009 Kaminkow et al.
7,553,231 B2 6/2009 Rodgers et al.
7,578,735 B2 8/2009 Frizzell et al.
7,601,062 B2 10/2009 Cole et al.
7,604,538 B2 10/2009 Pacey
7,625,278 B2 12/2009 Paulsen et al.
7,654,895 B2 2/2010 Pacey
7,654,899 B2 2/2010 Durham et al.
7,699,699 B2 4/2010 Gilliland et al.
7,704,141 B1 4/2010 Marks et al.
7,744,460 B2 6/2010 Walker et al.
7,785,191 B2 8/2010 Marks et al.
7,841,934 B2 11/2010 Gauselmann
7,980,936 B2 7/2011 Mead
8,021,225 B2 9/2011 Okada
8,066,563 B1 11/2011 Schultz et al.
8,083,581 B2 12/2011 Marks et al.
8,105,145 B2 1/2012 Jaffe
8,105,151 B2 1/2012 Caputo et al.
8,147,322 B2 4/2012 Walker et al.
8,162,740 B2 4/2012 Aoki
8,162,741 B2 4/2012 Wadleigh et al.
8,192,275 B2 6/2012 Aoki et al.
8,246,442 B1 8/2012 Barrie
8,287,357 B2 10/2012 Evans
8,323,091 B2 12/2012 Frank et al.
8,357,041 B1 1/2013 Saunders
8,360,851 B2 1/2013 Aoki et al.
8,366,538 B1 2/2013 Saunders et al.
8,371,930 B1 2/2013 Saunders et al.
8,388,432 B2 3/2013 Mattice et al.
8,414,380 B2 4/2013 Saunders et al.
8,465,358 B2 6/2013 Kemper
8,496,522 B2 7/2013 Caputo et al.
8,512,121 B2 8/2013 Macvittie et al.
8,512,124 B2 8/2013 Bramble et al.
8,512,138 B2 8/2013 Saunders
8,523,659 B2 9/2013 Evans
8,574,059 B2 11/2013 Rodgers et al.
8,602,868 B2 12/2013 Johnson et al.
8,608,545 B2 12/2013 Arora et al.
8,662,986 B2 3/2014 Rodgers et al.
8,690,660 B2 4/2014 Saunders et al.
8,696,434 B2 4/2014 Tsukahara
8,702,487 B2 4/2014 Thomas
8,790,169 B2 7/2014 Saunders
8,795,059 B2 8/2014 Aoki et al.
8,821,254 B2 9/2014 Tsukahara
8,834,258 B2 9/2014 Gobe et al.
8,851,974 B2 10/2014 Caputo et al.
8,870,642 B2 10/2014 Leupp et al.

(56) References Cited

U.S. PATENT DOCUMENTS 8,882,578 B2 11/2014 Saunders
8,961,291 B2 2/2015 Dias Pires et al.
9,005,022 B2 4/2015 Saunders
9,011,233 B2 4/2015 Ryan
9,098,847 B2 8/2015 Basallo et al.
9,098,973 B2 8/2015 Basallo et al.
9,123,209 B2 9/2015 Pacey et al.
9,165,433 B2 10/2015 Caputo
9,202,345 B2 12/2015 Zoltewicz et al.
9,215,524 B2 12/2015 McKinnon et al.
9,230,410 B2 1/2016 Saunders et al.
9,245,421 B2 1/2016 Saunders et al.
9,251,667 B2 2/2016 Marks et al.
9,257,011 B2 2/2016 Kitamura et al.
9,257,017 B2 2/2016 Saunders et al.
9,262,895 B2 2/2016 Rodgers et al.
9,275,524 B2 3/2016 Nicely
9,299,224 B2 3/2016 Leupp
9,311,781 B2 4/2016 Edwards
9,349,251 B2 5/2016 Caputo et al.
9,355,528 B2 5/2016 Nicely
9,418,521 B1 8/2016 Henrick et al.
9,424,720 B2 8/2016 Suda
9,430,900 B2 8/2016 Zoltewicz et al.
9,466,169 B2 10/2016 Basallo et al.
9,474,972 B2 10/2016 Lenger
9,495,839 B2 11/2016 Aoki et al.
9,595,157 B2 3/2017 Rasmussen et al.
9,633,506 B2 4/2017 Basallo et al.
9,928,691 B2 3/2018 Olive
10,013,855 B2 7/2018 Nakamura
10,037,651 B2 7/2018 You et al.
10,043,350 B2 8/2018 Gomez et al.
10,204,473 B2 2/2019 Lenger
10,242,533 B2 3/2019 Okada et al.
10,258,869 B2 4/2019 Ludwick
10,339,761 B2 7/2019 Olive
10,366,575 B2 7/2019 Visser
10,388,112 B2 8/2019 You et al.
10,417,877 B2 9/2019 Gomez et al.
10,475,294 B2 11/2019 Gomez et al.
10,497,203 B2 12/2019 Elmqvist
10,546,450 B2 1/2020 Ito et al.
10,643,431 B2 5/2020 Chesworth et al.
10,672,220 B2 6/2020 Lenger
10,706,664 B2 7/2020 Boese et al.
10,726,676 B2 7/2020 You et al.
10,769,888 B2 9/2020 You et al.
10,839,648 B2 11/2020 Okada et al.
10,957,161 B2 3/2021 Chesworth et al.
11,017,638 B2 5/2021 Chesworth et al.
2001/0021666 A1 9/2001 Yoshida et al.
2002/0016200 A1 2/2002 Baerlocher et al.
2002/0045474 A1 4/2002 Singer et al.
2002/0119818 A1 8/2002 Savio et al.
2002/0155881 A1 10/2002 Yoshida
2002/0183105 A1 12/2002 Cannon et al.
2003/0017865 A1 1/2003 Beaulieu et al.
2003/0027619 A1 2/2003 Nicastro, Sr.
2003/0035346 A1 2/2003 Laughlin
2003/0064782 A1 4/2003 Beaulieu et al.
2003/0064796 A1 4/2003 Glavich et al.
2003/0064801 A1 4/2003 Breckner et al.
2003/0064802 A1 4/2003 Rodgers et al.
2003/0069063 A1 4/2003 Bilyeu et al.
2003/0130034 A1 7/2003 Suganuma et al.
2003/0157980 A1 8/2003 Loose et al.
2003/0216165 A1 11/2003 Singer et al.
2004/0012145 A1 1/2004 Inoue
2004/0023714 A1 2/2004 Asdale
2004/0043815 A1 3/2004 Kaminkow
2004/0048646 A1 3/2004 Visocnik
2004/0092315 A1 5/2004 Boyd et al.
2004/0137982 A1 7/2004 Cuddy et al.
2004/0171417 A1 9/2004 Beaulieu et al.
2004/0198489 A1 10/2004 Kaminkow et al.
2005/0054442 A1 3/2005 Anderson et al.
2005/0130731 A1 6/2005 Englman et al.
2005/0159208 A1 7/2005 Pacey
2006/0009286 A1 1/2006 Durham et al.
2006/0063588 A1 3/2006 Poole
2006/0068873 A1 3/2006 Gomez
2006/0111173 A1 5/2006 Yang
2006/0142080 A1 6/2006 Enzminger
2006/0189369 A1 8/2006 Taylor
2006/0205469 A1 9/2006 Schultz et al.
2006/0247002 A1 11/2006 Yoshimi et al.
2007/0060248 A1 3/2007 Rodgers et al.
2007/0060255 A1 3/2007 Baerlocher et al.
2007/0060275 A1 3/2007 Gilmore et al.
2007/0129135 A1 6/2007 Marks et al.
2007/0149267 A1 6/2007 Ross et al.
2007/0281784 A1 12/2007 Seelig et al.
2007/0287529 A1 12/2007 Kojima
2008/0003278 A1 1/2008 Mondelo
2008/0004532 A1 1/2008 Rubey et al.
2008/0032784 A1 2/2008 Englman
2008/0045298 A1 2/2008 Yoshizawa
2008/0045320 A1 2/2008 Kato
2008/0108408 A1 5/2008 Wolf
2008/0108411 A1 5/2008 Jensen et al.
2008/0108422 A1 5/2008 Hedrick et al.
2008/0108431 A1 5/2008 Cuddy et al.
2008/0132321 A1 6/2008 Pau
2008/0182647 A1 7/2008 Brunet De Courssou et al.
2008/0274789 A1 11/2008 Singer et al.
2009/0036208 A1 2/2009 Pennington et al.
2009/0124326 A1 5/2009 Caputo et al.
2009/0156287 A1 6/2009 Baumgartner
2009/0181755 A1 7/2009 Gagner et al.
2009/0227356 A1 9/2009 Moroney
2009/0239634 A1 9/2009 Nguyen
2009/0291741 A1 11/2009 Schofield
2010/0016055 A1 1/2010 Englman
2010/0075737 A1 3/2010 Bluemel
2010/0113133 A1 5/2010 Leupp
2010/0167815 A1 7/2010 Gagner et al.
2010/0203948 A1 8/2010 Falciglia, Sr.
2010/0210343 A1 8/2010 Englman et al.
2010/0234092 A1 9/2010 Gomez et al.
2010/0304832 A1 12/2010 Kup-Ferroth
2011/0111824 A1 5/2011 Cuddy et al.
2011/0130192 A1 6/2011 Englman et al.
2011/0230251 A1 9/2011 Nicely et al.
2011/0244943 A1 10/2011 Milford et al.
2011/0300937 A1 12/2011 Crowder, Jr. et al.
2012/0015707 A1 1/2012 Hornik et al.
2012/0077564 A1 3/2012 Collette et al.
2012/0094738 A1 4/2012 Aoki et al.
2012/0122532 A1 5/2012 Berman et al.
2012/0178517 A1 7/2012 Montenegro et al.
2012/0220360 A1 8/2012 McAllister et al.
2013/0065663 A1 3/2013 Johnson et al.
2013/0102375 A1 4/2013 Aoki et al.
2013/0260861 A1 10/2013 Vann et al.
2014/0014186 A1 1/2014 Bhattacharya et al.
2014/0024429 A1 1/2014 Aoki et al.
2014/0031101 A1 1/2014 Jaffe et al.
2014/0051496 A1 2/2014 Meyer
2014/0066170 A1 3/2014 Aoki et al.
2014/0141860 A1 5/2014 Meyer
2014/0179396 A1 6/2014 Aoki et al.
2014/0274281 A1 9/2014 Jaffe
2014/0274292 A1 9/2014 Suda
2014/0323198 A1 10/2014 Tuck
2015/0031437 A1 1/2015 Gomez et al.
2015/0050983 A1* 2/2015 Delekta ............... G07F 17/3213
463/20
2015/0170462 A1 6/2015 Berman et al.
2015/0206386 A1 7/2015 Jaffe et al.
2015/0269809 A1 9/2015 Smith
2015/0287269 A1 10/2015 Berman
2015/0348359 A1 12/2015 Comeau et al.
2015/0356833 A1 12/2015 Aoki et al.

(56) References Cited

U.S. PATENT DOCUMENTS

| | | | | |
|---|---|---|---|---|
| 2015/0379831 | A1 | 12/2015 | Lee et al. | |
| 2016/0042597 | A1 | 2/2016 | Olive | |
| 2016/0086448 | A1 | 3/2016 | Aoki et al. | |
| 2016/0155303 | A1 | 6/2016 | Aoki et al. | |
| 2017/0092070 | A1 | 3/2017 | Marston et al. | |
| 2017/0154498 | A1 | 6/2017 | Olive | |
| 2017/0372558 | A1 | 12/2017 | You et al. | |
| 2018/0268655 | A1 | 9/2018 | Olive | |
| 2018/0268659 | A1 | 9/2018 | Chesworth et al. | |
| 2019/0236905 | A1 | 8/2019 | Washington et al. | |
| 2019/0295377 | A1 | 9/2019 | Suda et al. | |
| 2019/0304244 | A1 | 10/2019 | Kennedy et al. | |
| 2019/0340880 | A1 | 11/2019 | You et al. | |
| 2019/0347908 | A1 | 11/2019 | Bolling, Jr. | |
| 2020/0090467 | A1 | 3/2020 | Marks et al. | |
| 2020/0250923 | A1 | 8/2020 | Ceniceroz et al. | |
| 2020/0279457 | A1 | 9/2020 | Chesworth et al. | |
| 2020/0364982 | A1 | 11/2020 | You et al. | |
| 2021/0134120 | A1* | 5/2021 | Sanborn .............. | G07F 17/3211 |
| 2021/0366226 | A1 | 11/2021 | Cohn et al. | |
| 2021/0366227 | A1 | 11/2021 | Milosevich | |
| 2021/0366236 | A1 | 11/2021 | Soong | |
| 2021/0366237 | A1 | 11/2021 | Bouvier et al. | |
| 2021/0375098 | A1 | 12/2021 | Chesworth et al. | |

FOREIGN PATENT DOCUMENTS

| | | | |
|---|---|---|---|
| AU | 2015210489 | A1 | 2/2016 |
| GB | 2097160 | B | 5/1984 |
| GB | 2144568 | B | 9/1985 |
| GB | 2251112 | A | 6/1992 |

OTHER PUBLICATIONS

"Cash Burst—Force of Babylon", Scientific Games, 2020, 5 pages.

"Lock It Link—Huff N' Puff", SG Gaming, 2017, 2 pages.

"Locked & Loaded—Huff N' Puff", SG Gaming, 2017, 2 pages.

"IGT—Bubble Blast Link", Indian Gaming, Jul. 8, 2021, retrieved from: https://www.indiangaming.com/igt-bubble-blast-link/, 3 pages.

"Konami Launch New Prize Drop Range With a Feature Twist Players Will Love", The Drop, Dec. 17, 2019, retrieved from: https://thedrop.com.au/konami-launch-new-prize-drop-range-with-a-feature-twist-players-will-love/, 4 pages.

Zodiac Lion Class III Slot Game; IGT; Casino Journal, Mar. 5, 2020.

Zodiac Lion Slot Machine Snapshots from YouTube Video posted Aug. 15, 2019.

Ancient Arcadia game brochure, Copyright 2011 IGT.

Flying Carpet game brochure, Copyright 2008 Bally.

Golden Knight game brochure, Copyright 2010 IGT.

Sultan of Mars game brochure, Copyright 2011 IGT.

The Amulet and the Charm game brochure, Copyright 2011 IGT.

* cited by examiner

GAMING MACHINE AND METHOD USING LINKED VALUE-BEARING SYMBOLS

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, SG Gaming, Inc.

FIELD OF THE INVENTION

The present invention relates to a technological improvement to gaming systems, gaming machines, and methods and, more particularly, to new and improved animations in connection with a linked value-bearing symbol feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided a gaming system comprises a presentation assembly of a gaming machine that presents a plurality of symbol positions and game-logic circuitry in communication with the presentation assembly. The game-logic circuitry is configured to cause the presentation assembly to (i) in response to an activation event, associate a first symbol position with an award region and (ii) present a subsequent game outcome after the activation event by populating the symbol positions with randomly selected symbols. The game-logic circuitry further detects whether or not a symbol of a linked symbol group occupies the first symbol position of the award region in the subsequent game outcome. The linked symbol group includes a plurality of value-bearing symbols, wherein each value-bearing symbol of the linked symbol group includes a respective position within the linked symbol group and award indicia visibly indicating a corresponding award value. The game-logic circuitry causes, in response to detecting a first value-bearing symbol of the linked symbol group occupies the first symbol position while the award region is active, the presentation assembly to provide an award for the award values of at least one value-bearing symbol within the linked symbol group based at least in part on the position of the first value-bearing symbol relative to the positions of other value-bearing symbols within the linked symbol group. The gaming system may be partially or wholly integrated within a gaming machine.

According to another embodiment of the present invention, there is provided a method for conducting and presenting a game feature using a gaming system including a presentation assembly of a gaming machine and game-logic circuitry in communication with the presentation assembly. The method comprises: (i) presenting, by the presentation assembly, a plurality of symbol positions; (ii) causing, by the game-logic circuitry in response to an activation event, the presentation assembly to associate a first symbol position with an award region; (iii) causing, by the game-logic circuitry, the presentation assembly to present a subsequent game outcome after the activation event by populating the symbol positions with randomly selected symbols; (iv) detecting, by the game-logic circuitry, whether or not a symbol of a linked symbol group including a plurality of value-bearing symbols occupies the first symbol position of the award region in the subsequent game outcome, wherein each value-bearing symbol of the linked symbol group includes a respective position within the linked symbol group and award indicia visibly indicating a corresponding award value; and (v) causing, by the game-logic circuitry in response to detecting a first value-bearing symbol of the linked symbol group occupies the first symbol position while the award region is active, the presentation assembly to provide an award for the award values of at least one value-bearing symbol within the linked symbol group based at least in part on the position of the first value-bearing symbol relative to the positions of other value-bearing symbols within the linked symbol group.

Additional aspects of the invention will be apparent to those of ordinary skill in the art in view of the detailed description of various embodiments, which is made with reference to the drawings, a brief description of which is provided below.

Figure 1:
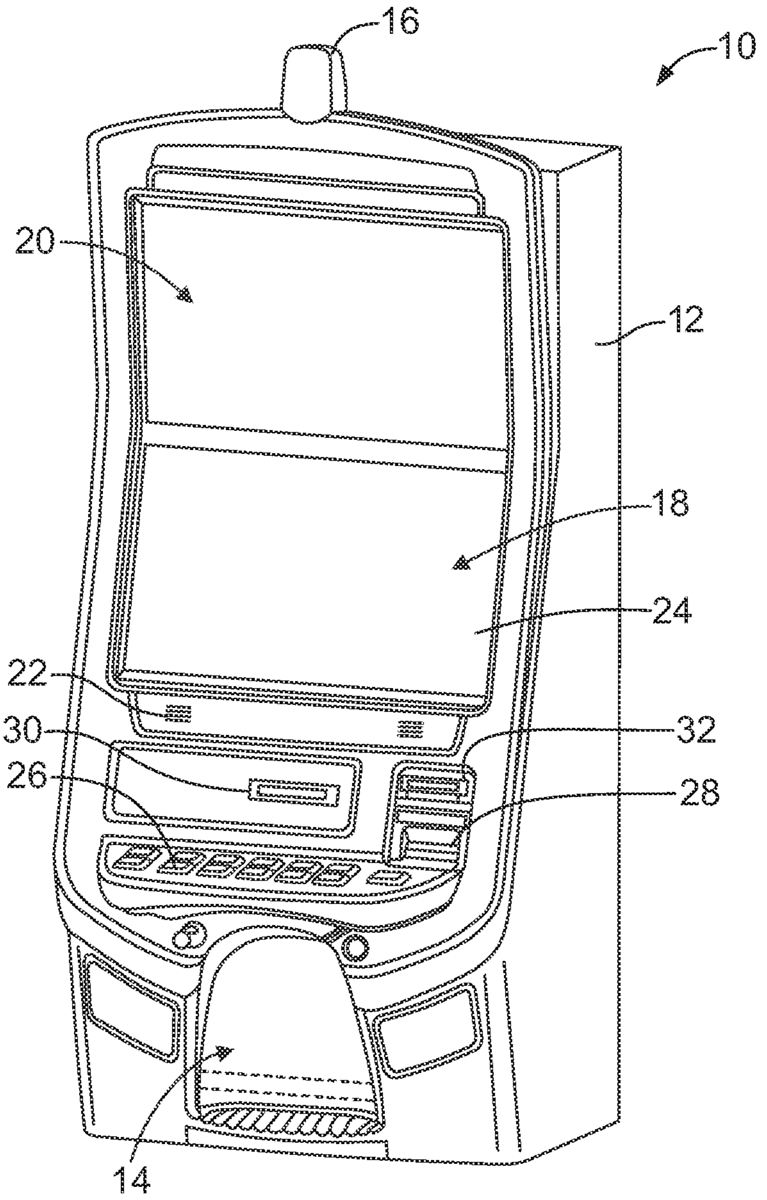
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Embodiments of the present invention comprise an innovative application of data processing steps that, when implemented by game-logic circuitry, direct a presentation assembly to present a symbol-value collection, selection, and award process that minimizes processing overhead by utilizing numbered indicia to represent credit values instead of complex, fanciful game images. Further, the process collects displayed values borne by special symbols (i.e., value-bearing symbols) on award elements, such as a segmented wheel, and selects one of the collected values from the award elements according to stored, variable criteria. In this way, the value-bearing symbols and award elements provide building blocks for innumerable different collection and selection sequences simply by manipulating the criteria associated with the value-bearing symbols and award elements, resulting in fewer rules needed for the award process than would be necessary for calculating values of winning symbol combinations enumerated in stored paytables, as found in prior art reel-spinning routines. At the same time, embodiments of the present invention provide a straightforward, what-you-see-is-what-you-get (WYSIWYG) visual presentation that is simple to understand and, therefore, effective in generating player excitement and enthusiasm. The result is a highly flexible value-award process that can be easily adapted to any theme/brand while remaining easily understood by players.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 200 (see FIGS. 4-7). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 200 (see FIGS. 4-7), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
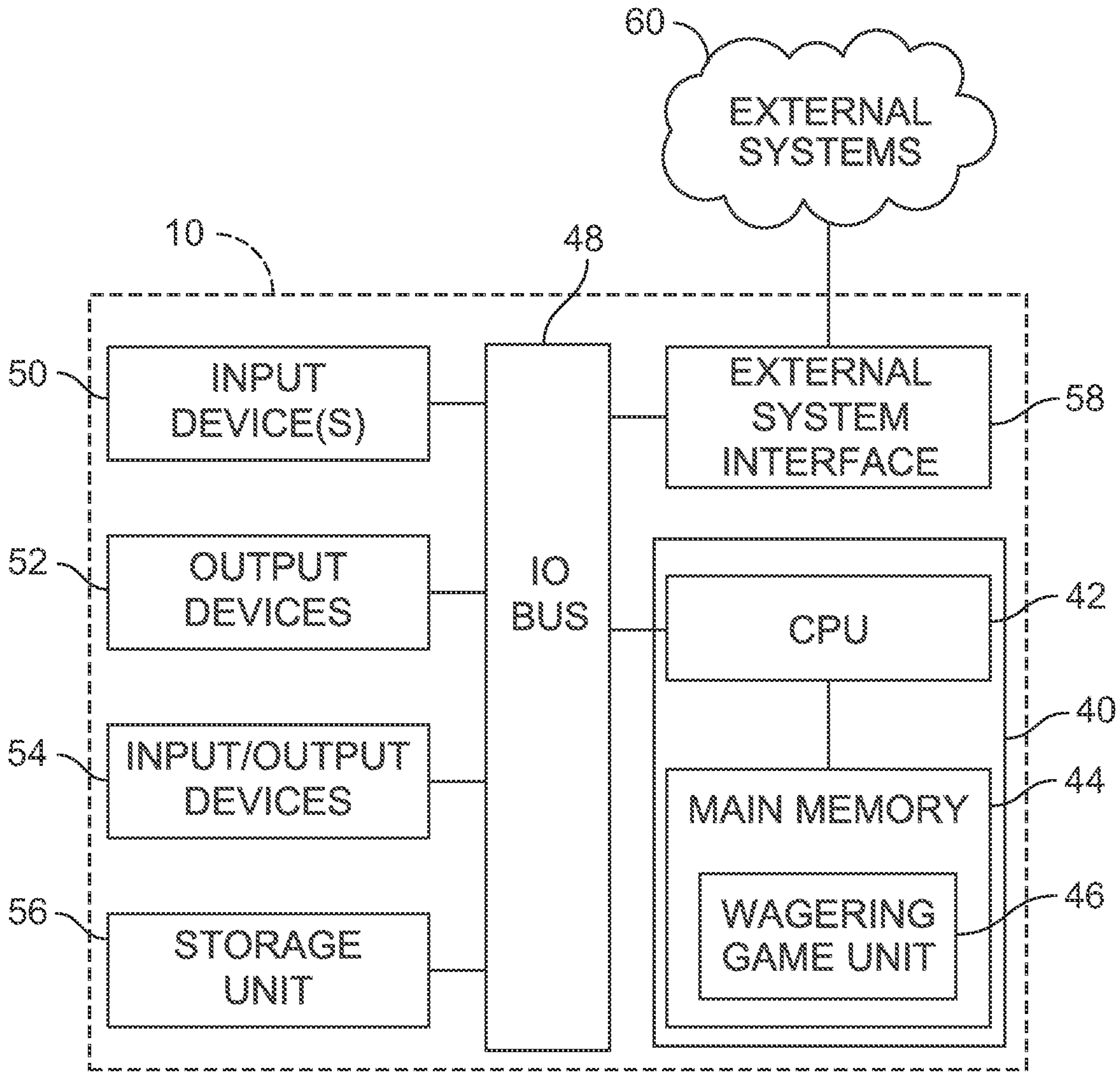
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be implemented with hardware and software architectures, circuitry, and other special features that differentiate it from general-purpose computers (e.g., desktop PCs, laptops, and tablets).

In at least some embodiments, the systems and methods described herein are configured to conduct and present a game feature with grouped award symbols. That is, symbols used to populate a game interface (e.g., an array of symbol positions) include one or more sets of linked symbols. In response to a trigger event or trigger condition, at least a portion of a linked set of symbols presented on the game interface is awarded. In one example embodiment, trigger indicia are selectively activated for symbol positions on the array, and the trigger event includes detecting a symbol from a linked set of symbols occupying a symbol position with active trigger indicia. In response to detecting the symbol, one or more awards are provided for linked set of symbols based on the relative position of the detected symbol and the other symbols within the linked set. For example, any symbols in the linked set above (and/or in other suitable predetermined directions) the detected symbol may be associated with the provided award. Additional embodiments and details of these systems and methods are provided below.

Figure 3:
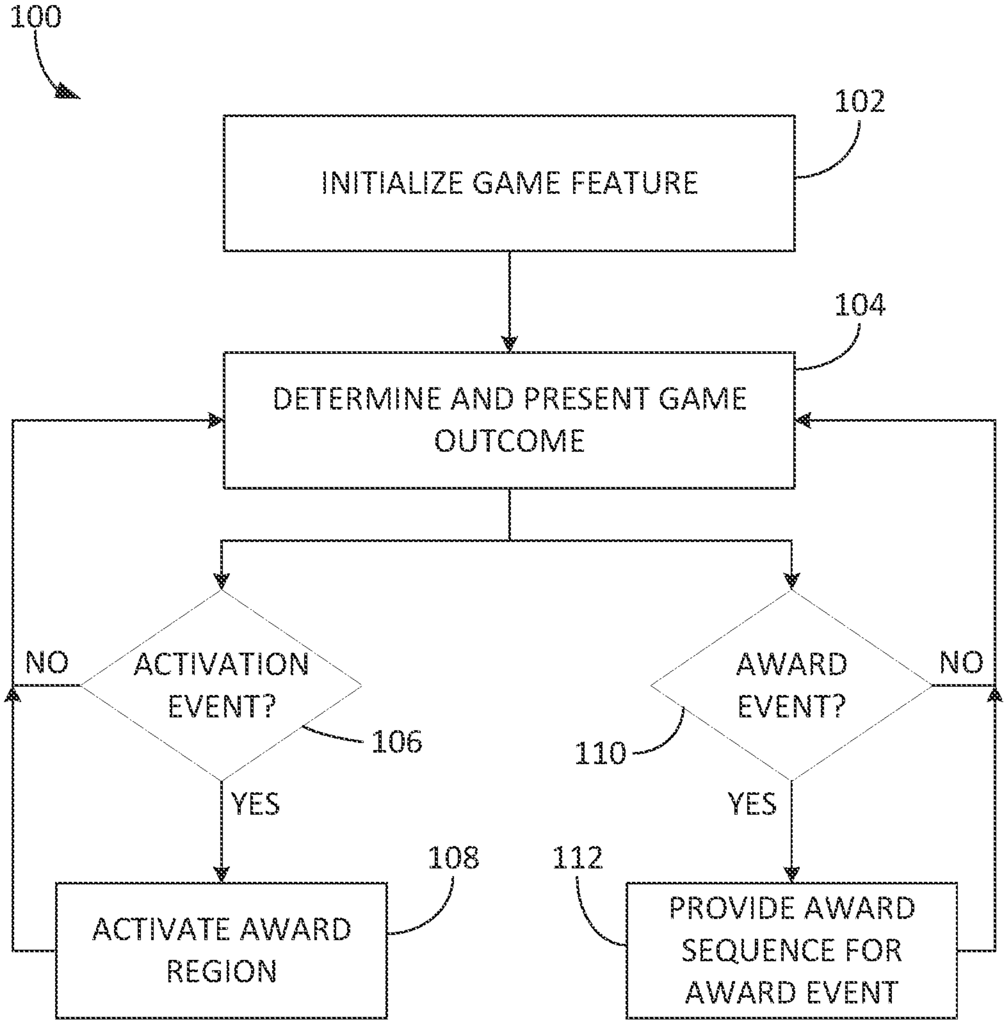
FIG. 3 is a flowchart for a data processing method that corresponds to instructions executed by a controller, according to an embodiment of the present invention.

FIG. 3 depicts a flow diagram of an example method 100 for conducting and presenting a game feature using a gaming system, such as the gaming system shown in FIG. 2. In the example embodiment, the method 100 is at least partially executed using game-logic circuitry (e.g., game-logic circuitry 40, shown in FIG. 2) in communication with a presentation assembly to present the game feature. In other embodiments, the method 100 includes additional, fewer, or alternative steps and/or is executed by additional or alternative devices and components of the gaming system, including those steps and devices described elsewhere herein.

The method 100 begins at step 102 with initializing the game feature. In the example embodiment, the game feature is a base game feature of a game. That is, the game feature is the default game feature that the player initiates when beginning a gaming session at a gaming machine. To begin a gaming session, the player may be prompted to provide a credit input to establish a credit balance for play of the game feature. For example, the credit input may be one or more physical items (e.g., bills, coins, tickets, cards, etc.) that are received by a corresponding credit input device to establish the credit balance. In another example, the credit input is established by linking a player account and/or digital wallet of the player to the gaming session, thereby enabling the player to transfer or release funds to establish the credit balance. The link may be established through the player providing an identifier to the gaming machine, such as through providing a physical item readable by the gaming machine (e.g., a card or ticket) or establishing a communication link between the gaming machine and a player device. In certain embodiments, the player device communicates with a server or other device (e.g., an accounting server) to provide the credit input. In other embodiments, the credit input is non-monetary, and the credit is applied to the gaming session in the same or other methods to the gaming session. For example, rather than retrieving funds from a player account, the player account may have a limited number of credits or play time allocated for use as a credit balance.

The established credit balance is used to fund wagers within play of the game. That is, each wager placed decreases the credit balance. Any credit awards provided during the game increase the credit balance. The credit balance is presented by the presentation assembly to enable the player to visually monitor the credit balance.

In other embodiments, the game feature is a bonus game feature or other type of game feature paired with a default game feature. In such embodiments, the game feature may be initiated through game events, game conditions, and/or player inputs originating from another game feature. For example, the game feature associated with the method 100 may be initiated in response to a particular combination of symbols occurring in a base game feature. The game feature may have a limited duration (e.g., a number of free spins) such that the game continues into another game feature (e.g., the base game feature) following the expiration of the game feature's duration. Although the method 100 is described herein using a base game feature, it is to be understood that the method 100 may be altered for a bonus game feature to accommodate the limited duration of the game feature and/or provide additional or enhanced awards. In certain embodiments, the game includes both a base game feature and a bonus game feature incorporating the functionality described herein. In such embodiments, the bonus game feature may include enhancements or alternations to be distinct from the base game feature.

In the example embodiment, initializing the game feature includes causing the presentation assembly to present a game interface. The game interface includes a plurality of symbol positions arranged into rows and columns of a symbol array. In other embodiments, the symbol positions may be arranged into other configurations (e.g., multiple symbol arrays). The symbol positions are selectively filled with symbols for play of the game feature. The symbols are randomly selected from one or more sets of available symbols. The random selection may include, for example, the game-logic circuitry generating a random number or other random outcome through the random number generator and comparing the random number to a table of the available symbols. The table matches each available symbol to one or more random values, and weighting parameters may be applied such that one symbol is associated with more values than another symbol, thereby increasing the probability of selecting the one symbol over the other symbol. The random selection is not limited to weighted tables, and other suitable methods of random selection are contemplated to be within the spirit and scope of the present disclosure.

In some embodiments, the sets of available symbols include symbol-bearing reel strips that are associated with one or more respective symbol positions of the array. In one example, a respective reel strip is associated with each column of the symbol array. In another example, each symbol position is associated with a respective reel strip. These reel strips organize the available symbols into a particular order, and the symbols presented within the associated symbol positions are based on the predefined order. The weighted table associated with the reel strip may include reel stop positions linked to random values rather than linking the symbols directly to the random values, where the reel stop position dictates, based on the predefined order, which symbols are to be presented. In other embodiments, other suitable methods of random selection from the reel strips are used. In certain embodiments, the order and/or the available symbols of the reel strip are dynamic and be changed and/or rearranged within play of the game feature.

At least one set of available symbols includes a linked set of symbols (also sometimes referred to herein as a "linked group"). The linked set of symbols are symbols that are visually linked together (and distinctive from non-linked symbols) for the game feature described herein. In one example, for a linked set of symbols presented together (e.g., the linked symbols are presented sequentially together within a reel strip), the visual link between the symbols may be indicated through link indicia presented across the linked symbols, such as a chain or line presented through the linked symbols. In other embodiments, the linked symbols are not grouped together, but rather are presented with visual characteristics that enable the player to visually distinguish between linked symbols and non-linked symbols. For example, the linked symbols may include a visually distinctive background or other presentation indicia.

For the game outcomes described herein, the linked set of symbols can be wholly selected, partially selected, or remain unselected for presentation. That is, the linked set of symbols maintains the linked nature of the symbols even if only a portion of the symbols (e.g., one symbol) is present in a game outcome. As described in detail below, the hidden linked symbols may be included within an award associated with the linked set based on the position or order of the symbols within the linked set.

The linked set of symbols includes symbols for determining one or more award values. In the example embodiment, the linked set of symbols includes value-bearing symbols. The value-bearing symbols include award indicia that visually indicate an award value with the respective value-bearing symbol. In one example, the award indicia are text-based, numerical values presented within the value-bearing symbols and representing credit values. In other embodiments, other suitable award indicia may be used for the value-bearing symbols. In at least some embodiments, the linked set of symbols may include modifier symbols or other special symbols that impact the game outcome. The modifier symbols may be used to perform logical or mathematical operators on one or more award values. For example, the modifier symbols may include a multiplier symbol associated with a multiplier that is applied to the award value of one or more value-bearing symbols. In another example, the special symbols may include a jackpot trigger symbol used to selectively award a progressive jackpot associated with the game feature. Other modifiers and/or special symbols may be included within the embodiments of the game feature described herein.

At step 104, a game outcome or spin is determined by the game-logic circuitry and the presentation assembly presented the game outcome. Step 104 may be performed in response to player input and/or placement of a wager that is collected from the credit balance of the player. Determining a game outcome may include generating random values and comparing the generated values to the weighted tables to determine which symbols occupy the symbol array for the game outcome. Based on the symbols occupying the symbol array, the game-logic circuitry detects the presence of any game events within the outcome symbols. The game events may include, for example, winning outcomes (e.g., combinations of symbols associated with an award), bonus game triggers, activation events (described herein), and the like. The game-logic circuitry then performs a suitable action in response to any detected game event, such as provides an award to the credit balance of the player or initiates a bonus game feature. If no game event is detected in a game outcome, the game-logic circuitry may await player input and/or a subsequent wager to determine the next game outcome at step 104.

Based on the game outcome and the subsequent actions of the game-logic circuitry, the presentation assembly is configured to present the game outcome and other corresponding presentation sequences to the player. Presentation may include one or more audio, visual, and tactile presentations to the player to indicate the actions performed by the game-logic circuitry. For example, the presentation of a game outcome may include a spinning animation of the underlying reel strips that stops on the symbols selected for the game outcome. If a winning outcome is detected, an award sequence is shown by the presentation assembly to identify the symbols of the winning outcome and the award being added to the credit balance. It is to be understood that the other actions of the game-logic circuitry described herein may be reflected through presentation sequences of the presentation assembly.

At step 106, the game-logic circuitry determines whether or not an activation event has occurred in the game outcome. In the example embodiment, the activation event is the presence of an activation symbol within a symbol position of the array. The activation symbol may be dedicated to the activation event, or the activation symbol may include additional functionality (e.g., the activation symbol is a wild symbol for the purposes of determining winning outcomes). In other embodiments, other suitable activation events may be used, including activation events not tied to the symbols within the symbol array. For example, the activation event may include a random selection of a symbol position from the symbol array.

If no activation event is detected, the game-logic circuitry proceeds to continue to determine any other game events within the game outcome (e.g., the determination at step 110 as described herein). However, if an activation event is detected, the game-logic circuitry activates an award region based on the activation event at step 108. The award region is visually indicated through one or more animations and/or presentation elements that visually indicate one or more symbol positions within the award region. The visual indication of the award region may be within the symbol positions, outlining the symbol positions, and/or visually linked to the symbol positions in another suitable manner. In the example embodiment, the award region is defined by a border overlaid upon the symbol position of the award region.

In the example embodiment, the award region is limited to the symbol position occupied by the activation symbol. In other embodiments, the award region may include a plurality of symbol positions. In at least some embodiments, a plurality of award regions may be active at once. For example, if the game outcome includes a plurality of activation symbols, an award region is activated for each of the activation symbols.

The award region is configured to persist for at least one subsequent game outcome. In other embodiments, the award region is only active on the same game outcome as the activation event. As described in detail herein with respect to FIG. 4, the award region remains active for a limited duration. Following the duration, the award region become inactive, and the visual characteristics of the award region are hidden or otherwise changed to reflect the inactive state of the region. The duration of the award region may be predefined or dynamically determined. In one example, the duration of the award region is defined from a set of available durations (e.g., based on random selection and/or the conditions of the activation event). In another example, subsequent activation or award events may cause the award region to persist for at least one additional game outcome. In yet another example, the award region may be set to inactive in response to an award event for a linked set of symbols as described herein. Combinations of these dynamic conditions for the award region may be used to establish the duration of the award region in some embodiments.

In some embodiments, the award region may include a corresponding modifier. The modifier may be used to alter or enhance an award associated with the award region. The corresponding modifier may remain static through the duration of the award region or is dynamically updated in response to particular game events (e.g., another activation event occurring within the active award region) and/or the game outcomes. In one example, the modifier is a multiplier that increases in value by one in response to each game outcome with the award region remaining active. The modifier may be visually indicated with the award region (e.g., as indicia). In other embodiments, no modifier is associated with the award region. Following the activation of the award region at step 108, the game-logic circuitry proceeds to other determinations based on the game outcome (e.g., the determination at step 110) and/or proceeds to generate and present the next game outcome. The determinations for a game outcome may occur sequentially or in parallel based on the processing capabilities of the game-logic circuitry and/or the configuration of the computing instructions defining the game outcome determinations.

If an award region is active for a game outcome, the game-logic circuitry monitors the game outcome for an award event at step 110. More specifically, in the example embodiment, the award event includes a symbol of a linked set of symbols occupying the active award region. Other suitable award events associated with the award region may be used in other embodiments, including those events described elsewhere herein. If no award region is active, the determination at step 110 may be skipped for the game outcome, thereby enabling processing resources to be allocated to other functions and determinations. If an award region is active but no award event is detected, the game-logic circuitry proceeds to other determinations for the game outcome and/or proceeds to the next game outcome.

If an award event is detected, the game-logic circuitry determines a corresponding award and causes the presentation assembly to present an award sequence for the determined award at step 112. In at least some embodiments, the award is based on the relationship between the symbol within the award region and the other symbols of the linked set of symbols. That is, the relationship determines how many (if any) of the symbols of the linked set are included within the award. The relationship may be a positional relationship, an order relationship, and/or other suitable relationship that may be defined between the symbols of the linked set. In the example embodiment, where the linked set of symbols are organized to be presented sequentially on a reel strip, the award is for the symbol within the award region and any linked symbols above the award region, including those symbols that are currently hidden from the symbol array. That is, any linked symbol below the award region is not included within the award. Other suitable award determination rules may be used in addition to or in place of the rules of the example embodiment. For example, the symbols below the award region may be included in the award rather the symbols above the award region. In another example, the award may be limited to symbols currently presented in the symbol array such that hidden linked symbols are not considered for the award. In a further example, the linked symbols are not presented as a group, and the awarded symbols are determined based on the positional relationship of the symbol position of the award region and the symbol positions occupied by linked symbols throughout the array.

In at least some embodiments, the linked symbols include value-bearing symbols, and the award is determined at least partially as a function of the award values of the value-bearing symbols. In one example, particularly for embodiments in which the linked symbols are only value-bearing symbols, the award is an aggregated award of the award values. The award may also be a function of other modifiers from modifier symbols and/or the award region. In other embodiments, the award is not calculated from value-bearing symbols, but rather other suitable symbol-based awards may be used to determine the award. For example, the awarded symbols may be compared to a predefined set of award rules and/or the wager provided by the player to determine the award. In one example, the award is at least partially a function of the wager provided by the player and the number of awarded symbols from the linked set of symbols.

The award sequence presented by the presentation assembly is configured to visually indicate both the awarded symbols from the linked set of symbols and the corresponding award. In the example embodiment in which the symbols above the award region are awarded, the awarded symbols may be animated to cascade down into the symbol array and toward the award region, where the award is dynamically updated in response to each of the awarded symbols reaching the award region. The credit balance may then be updated to include the provided award. Other suitable award animations, presentation elements (e.g., text-based elements describing or identifying the award) and the like may be used in other embodiments by the presentation assembly.

In response to the award sequence, the award region may persist based on the preestablished duration or may be removed for the subsequent game outcome. That is, the duration of the award region may be unaffected by any award events or the award events cause the award region to transition to inactive irrespective of any remaining duration of the award region. In certain embodiments, award events associated with one active award region may cause other active award regions to become inactive. In other embodiments, the award event may change the duration of an award region without removing the award region. That is, the duration of the award region may increase or decrease in response to the award event. For embodiments with a modifier associated with an award region, the modifier may be changed in response to the award event in addition to or in place of affecting the duration of the award region.

Similar to step 108, following the award sequence, the game-logic circuitry proceeds to proceed to any remaining game outcome determinations and the subsequent game outcome. The game-logic circuitry may also be configured to detect any termination condition to conclude the game feature and/or the gaming session. For a base game feature, the termination condition may include, for example, the credit balance reaching a value below the minimum wager amount or the player initiating a payout sequence. The payout sequence includes providing the credit balance to the player. The credit balance may be provided through one or more physical items, such as bills, coins, tickets, cards, and the like being presented to the player by the gaming machine as representations of the credit balance. Additionally or alternatively, the credit balance may be applied to an account or digital wallet associated with the player. In response to the payout sequence, the gaming session concludes, and the gaming machine proceeds to an attraction state to await the next player initiating a subsequent gaming session. For bonus game features, the termination condition may be the expiration of the bonus game duration or detection of a termination event (which may include the absence of a game event) within the game outcome of the game feature. The termination of the bonus game feature may not result in the gaming session concluding, but rather the base game feature is initiated.

Figure 4:
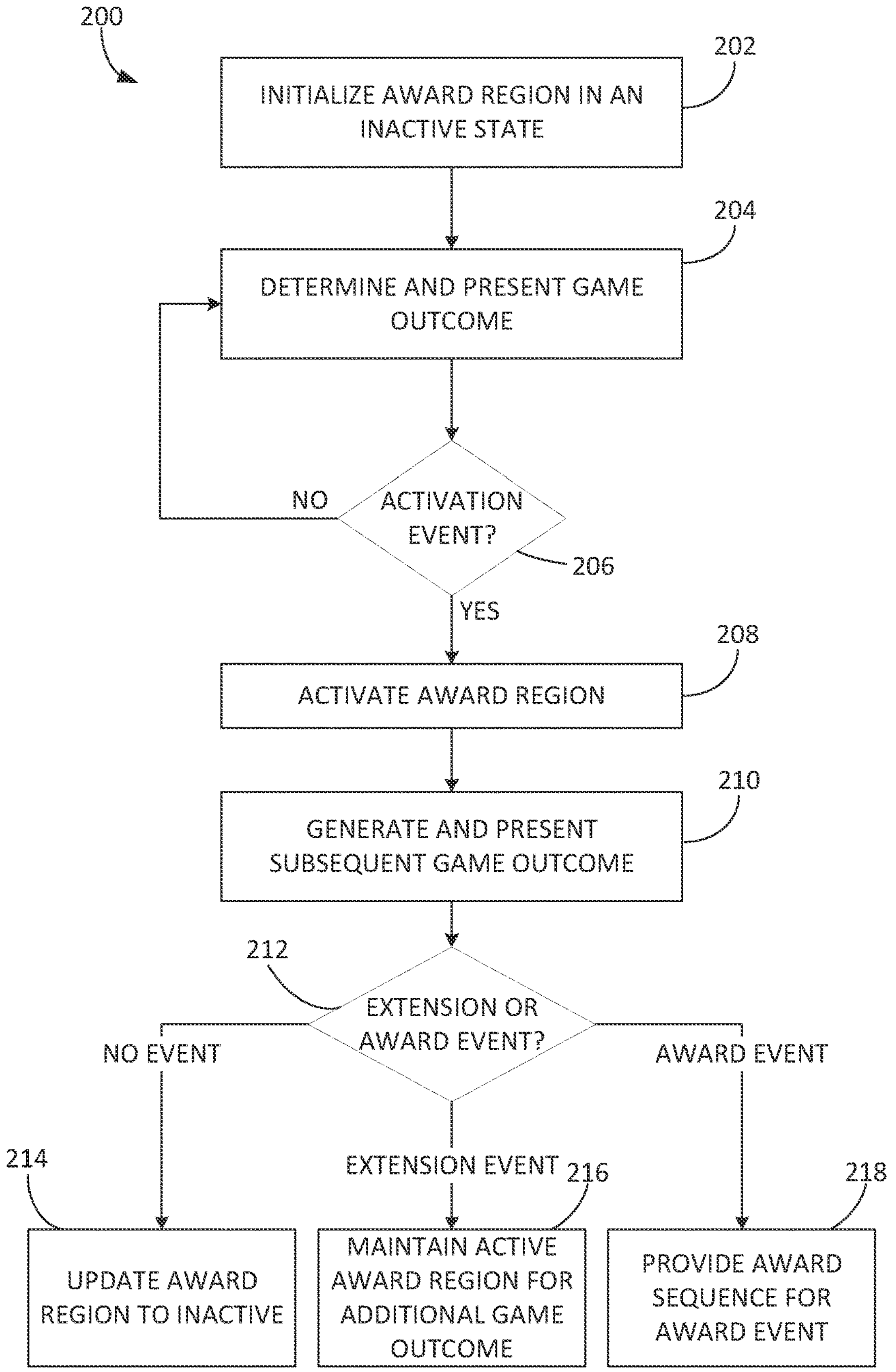
FIG. 4 is a flow diagram of an example method of providing an award region within a game feature similar to the game feature of FIG. 3, according to an embodiment of the present invention.

FIG. 4 depicts a flow diagram of an example method 200 of providing an award region within a game feature similar to the game feature of FIG. 3. The method 200 is executed by game-logic circuitry of a gaming system (e.g., the system shown in FIG. 2) and a presentation assembly of a gaming machine of the system. The system may be wholly integrated within the gaming machine or at least a portion of the game-logic circuitry may be separate from the gaming machine. In other embodiments, the method 200 may include additional, fewer, or alternative steps and/or may be performed using additional or alternative devices, including those steps and devices described elsewhere herein. Although the method 200 is described herein with respect to a single award region, it is to be understood that the method 200 may be performed for a plurality of concurrently active award regions.

In the example embodiment, the method 200 begins at step 202 where the award region is initialized in an inactive state. In the inactive state, the award region does not impact the game outcomes and the game-logic circuitry does not perform at least a portion of the steps of the method 200. In certain embodiments, the award region may be active in the initial state of the game feature. For example, the game-logic circuitry may randomly define active award regions within the symbol array in the initial state, or, for bonus game feature embodiments, the bonus game trigger may be used to activate one or more award regions.

At step 204, a game outcome is determined by the game-logic circuitry and presented by the presentation assembly. In the example embodiment, the game outcome includes populating the symbol array with randomly selected symbols. As set forth above, for a given game outcome, the game-logic circuitry analyzes the randomly selected symbols for detection of one or more game events. At step 206, the game-logic circuitry detects if an activation event is present in the game outcome. In the example embodiment, the activation event is the presence of an activation symbol in the symbol array. If no activation symbol is detected, steps 204 and 206 are repeated for one or more subsequent game outcomes if the game feature remains active.

If an activation symbol is detected, the award region corresponding to the symbol position occupied by the activation symbol is activated at step 208. More specifically, in response to the activation event, the game-logic circuitry causes the presentation assembly to present the award region. In some embodiments, the game-logic circuitry may establish a duration and/or modifier associated with the award region. The duration and/or modifier may be predefined, based on the activation event (e.g., the type of activation symbol), the number of active award regions, and/or other suitable conditions and parameters of the game feature. In certain embodiments, the duration and/or the modifier may be at least partially random. For example, the duration and/or modifier may be randomly selected from a set of available values. The duration and/or modifier of the award region may be stored as dedicated variables associated with the region, or the duration and/or modifier may be based on global, predefined rules as described herein.

The game feature then generates a subsequent game outcome at step 210 with the active award region presented by the presentation assembly. The subsequent game outcome includes a new set of randomly selected symbols occupying the symbol array. Based on the new randomly selected symbols, the game-logic circuitry determines whether or not an extension event or award event has occurred in the subsequent game outcome at step 212. If no extension event or award event is detected, the game-logic circuitry removes the award region (i.e., transitions the award region to active to inactive) or decreasing the remaining duration of the award region at step 214. For example, if the award region is active for four game outcomes, the game-logic circuitry decrements that remaining number of game outcomes by one. The change to the award region may be reflected through the presentation of the award region, such as by hiding or removing the inactive award region from the game interface. In some embodiments, step 214 may be performed unless an extension event is detected (i.e., irrespective of award events) such that steps 214 and 218 can be both be performed following the determination at step 212.

An extension event is a game event that extends or increases the duration of the award region at step 216. In one example, the extension event is the presence of a new activation event (either overlapping the award region or associated with another symbol position of the array). In another example, the extension event is also an award event. The extension event may be visually indicated to the player through one or more animations and/or presentation elements provided by the presentation assembly. In other embodiments, the game feature does not include extension events. That is, the award region is activated for a limited, predefined duration and is removed following the duration irrespective of any intervening game outcomes.

The award event, similar to the award event described with respect to FIG. 3, is the presence of a linked set of symbols occupying the award region. In the example embodiment, the linked set of symbols are presented as a group such that adjacent linked symbols are presented in adjacent symbol positions. Based on the positional relationship of the linked symbol within the award region and the other linked symbols, an award is determined. More specifically, in the example embodiment, the symbols within and above the award region are identified as the "awarded symbols" while linked symbols below are not including within the award. It is to be understood that the terms "above" and "below" are relative to the presentation of linked set of symbols. That is, a player would identify a linked symbol that is animated to move below the award region (and potentially out of the array altogether) as below the award region. If the linked set of symbols is defined as an array, the terms "above" and "below" may also be used to describe the relative array position of each linked symbol. It is to be understood that other relative terms (e.g., "left" and "right" or "first" and "last") may be used to distinguish the awarded and unawarded linked symbols, which may be based on the nature of the award region, the visual appearance of the game interface or game outcome, and the like.

The award generation and subsequent award sequence of step 218 is described in detail with respect to FIG. 3. In some embodiments, the award region is removed in response to the award sequence irrespective of the remaining duration. In other embodiments, the duration of the award region is unaffected by award events and proceeds towards the end of the duration (i.e., the remaining number of game outcomes is decreased by one). In further embodiments, the award event causes the duration of the award region to change. In one example, the duration of the award region increases or maintains the same duration. In another example, the duration of the award region is decreased by an increased amount in response to the award event, which may result in the duration expiring. If the award region includes a modifier, the modifier may be dynamic to change similar to the duration of the award region. In one example, the modifier is a multiplier, and the multiplier increases as the award region approaches the end of the duration. Changes to the duration and/or the modifier may be visually reflected through animations and/or presentation elements provided by the presentation assembly.

FIGS. 5A-5D depict a game interface 300 of an example game feature using award regions and linked symbols in a plurality of game states. The game interface 300 is presented by a presentation assembly of a gaming machine. The presentation assembly is in communication with game-logic circuitry (e.g., the circuitry 40, shown in FIG. 2) that conducts the game feature. In the example embodiment, the interface 300 includes a symbol array 302 of a plurality of symbol positions. The symbol positions are configured to be populated with randomly selected symbols as described herein. In other embodiments, the interface 300 includes additional, fewer, or alternative game elements and/or animations, including those elements and animations described elsewhere herein.

Figure 5A:
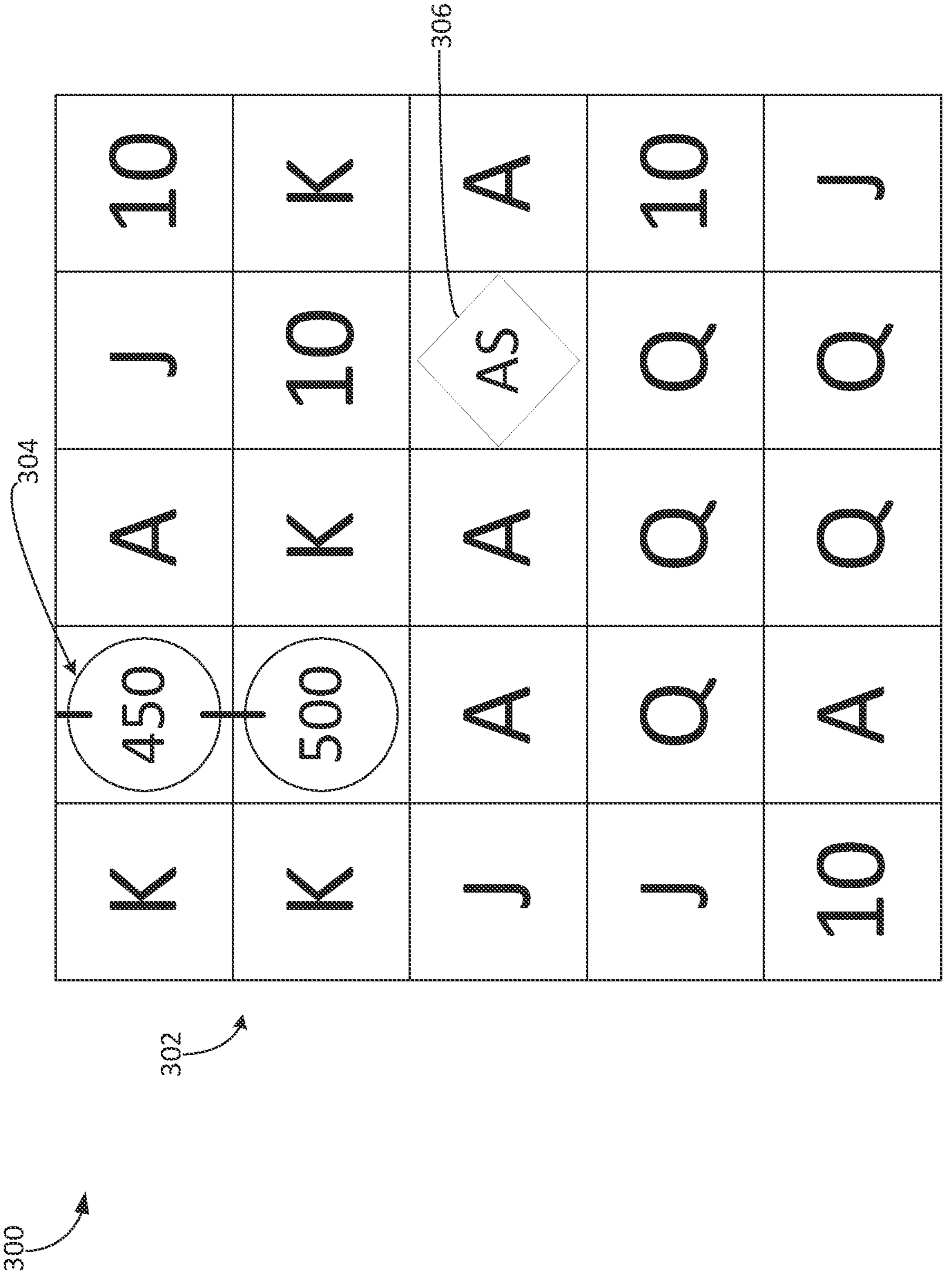
FIG. 5A is a game interface of an example game feature in a first game state, according to an embodiment of the present invention.

FIG. 5A depicts the game interface 300 is a first state. In the first state, the symbol array 302 is populated with a plurality of randomly selected symbols from a plurality of reel strips, where each reel strip is associated with a respective column of the array 302. In some embodiments, in addition to the functionality described herein, winning outcomes may be determined based on combinations of the randomly selected symbols and/or other suitable game events detectable based at least in part on the symbols occupying the array 302. In the example embodiment, the randomly selected symbols include a set of linked symbols 304 and an activation symbol 306. The linked set of symbols 304 are grouped together on a single reel strip such that the linked symbols occupy adjacent reel positions to each other.

Figure 6:
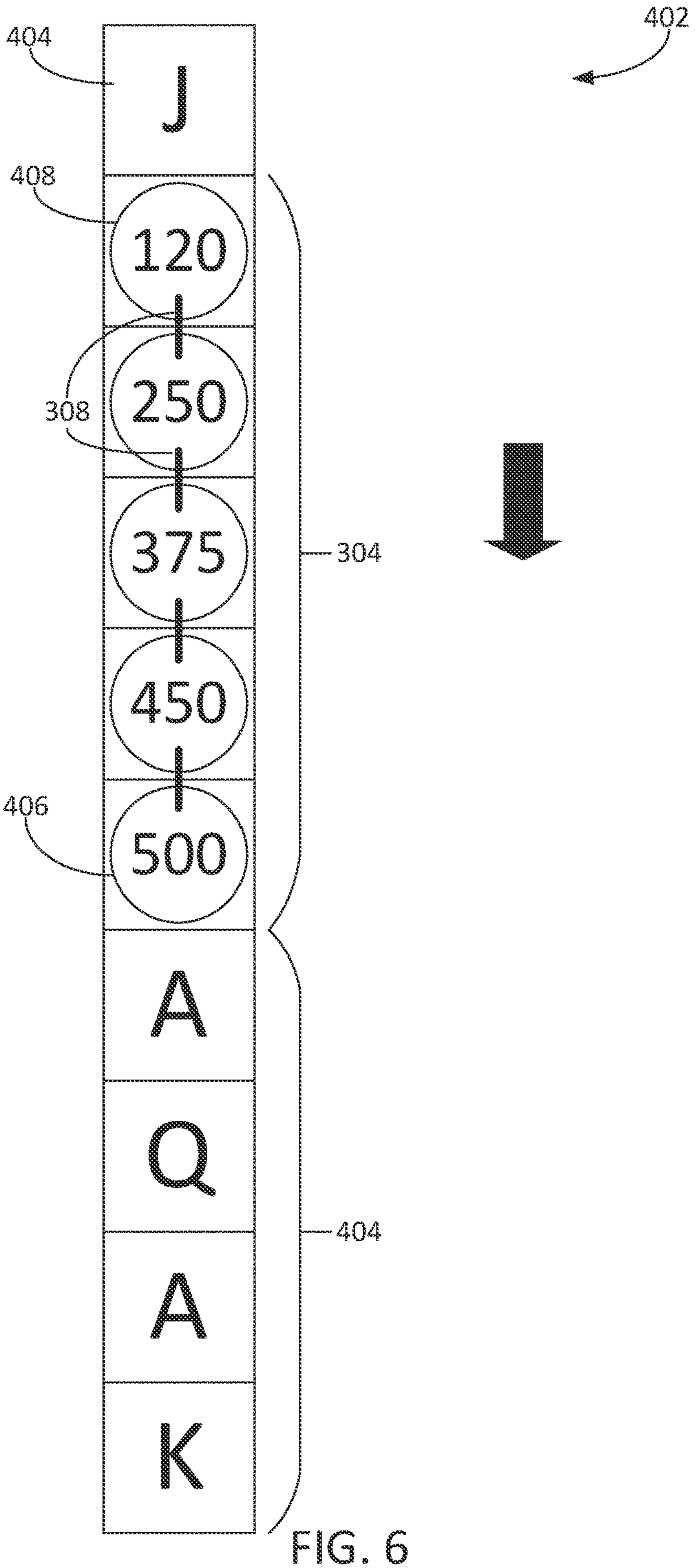
FIG. 6 is an example reel strip with a linked set of symbols, according to an embodiment of the present invention.

FIG. 6 depicts an example reel strip 402 that includes the linked set 304. The reel strip 402 also includes a plurality of unliked symbols (including an activation symbol similar the symbol 306 as described in detail below). The linked set of symbols 304 is visually indicated by the link elements 308 presented across the symbol positions occupied by adjacent linked symbols. It is to be understood that the link elements 308 are for exemplary purposes only and are not intended to limit the visual appearance of the link elements 308 to the illustrated embodiment. That is, other suitable presentation elements and/or animations may be used to visually distinguish the linked symbols from unliked symbols, such as a distinctive background color for the linked symbols.

As can be seen in the comparison of FIG. 5A and FIG. 6, the entirety of the linked set 304 is not presented at one time within the symbol array 302. However, for the purposes of animating a spin of the reel strip 402 and the award region feature described herein, the reel position of the linked symbols may be used to define the order in which the symbols are presented. For example, the reel strip 402 may be animated to spin such that a first linked symbol 406 enters the array 302 from the top before moving down through the bottom of the array 302, thereby exposing the following linked symbols through a last linked symbol 408. Physical reel strips are cyclical such that the order of the symbols is repeated through each rotation of the reel strip, and digital reel strips may be presented in a manner that emulates the functionality of a physical reel strip. In certain embodiments, the game-logic circuitry is configured to alter the order of the linked symbols and/or the unlinked symbols 404 for subsequent game outcomes. Given the spin animation and the order defined by the reel strip, the linked set 304 is presented in a manner in which the relative terms "above" and "below" can define positional relationships between linked symbols, including linked symbols that are not current presented within the symbol array 302.

In the example embodiment, the symbols of the linked set 304 are value-bearing symbols. That is, each symbol includes award indicia that visually indicates a corresponding award value. The value-bearing symbols may be dedicated to the award region feature described herein or have additional functionality for determining game outcomes, such as operating as wild symbols. In other embodiments, the linked set 304 may include additional or alternative symbol types, such as modifier symbols.

In the first state, there is no active award region occupied by the linked set of symbols 304. As a result, the linked set 304 does not result in an award sequence. In some embodiments, if no award region is active within the symbol positions associated with the reel strip 402, then the linked set 304 may be removed or otherwise replaced with symbols used in other aspects of the game feature (e.g., detecting winning outcomes based on combinations of symbols) until a corresponding award region is activated.

The activation symbol 306 is used to activate an award region. That is, the activation event monitored by the game-logic circuitry is the presence of any activation symbols within the symbol array 302 for a game outcome. In other embodiments, additional or alternative conditions may be required to trigger the activation event. For example, a plurality of activation symbols (accrued in one or more game outcomes) may be required. Similar to the linked symbols, the activation symbol 306 may have additional functionality within the game feature, including functionality described elsewhere herein for other symbols.

Figure 5B:
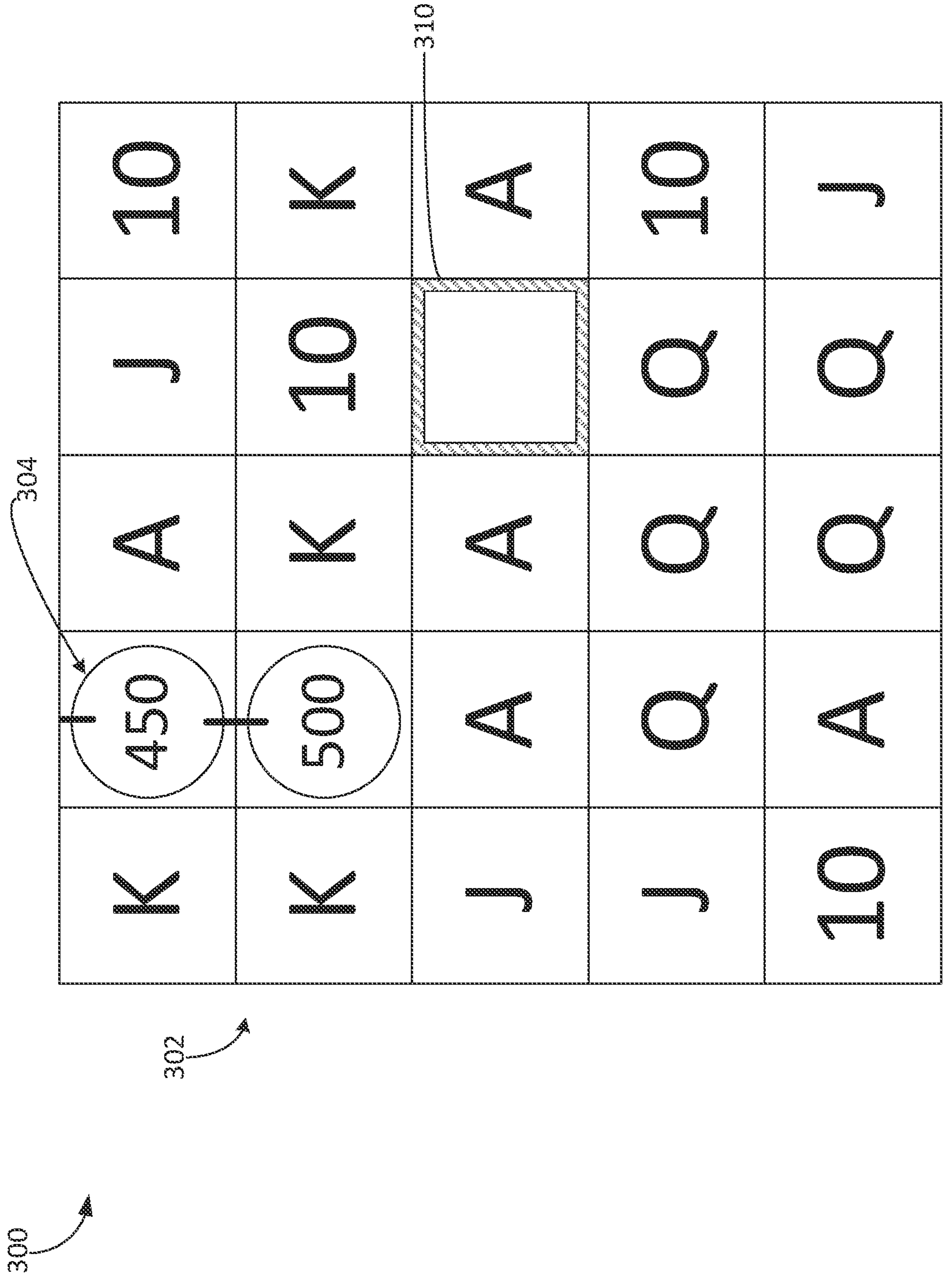
FIG. 5B is the game interface of FIG. 5A in a second game state, according to an embodiment of the present invention.

FIG. 5B depicts the game interface 300 in a second state following the first state. In the second state, an award region 310 is activated for the symbol position occupied by the activation symbol 306. The active award region 310 is depicted in the illustrated embodiment as an enhanced border around the symbol position. It is to be understood that additional or alternative visual elements may be used to distinguish the award region 310 from the other symbol positions of the array 302 in other embodiments. In the example embodiment, the award region 310 is configured to persist for one subsequent game outcome. Based on the subsequent game outcome, the award region 310 may be extended to additional game outcomes or removed (i.e., set to an inactive state). In other embodiments, the duration of the award region 310 may span a plurality of game outcomes. In one example, for a bonus game embodiment, the award region 310 may persist until the bonus game feature concludes.

Figure 5C:
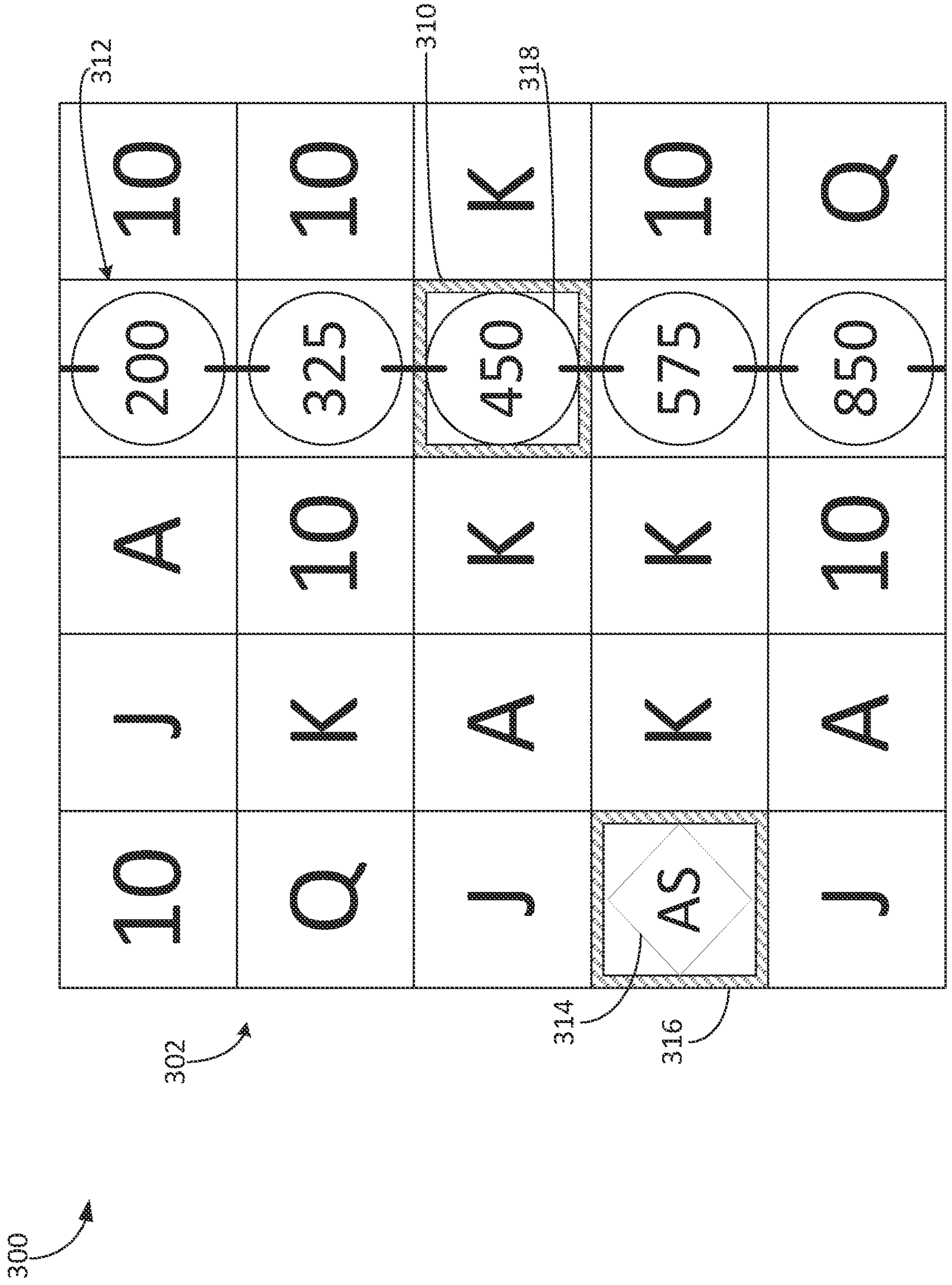
FIG. 5C is the game interface of FIG. 5A in a third game state, according to an embodiment of the present invention.

FIG. 5C depicts the game interface 300 in a third state following the second state. More specifically, the third state depicts the game outcome subsequent the game outcome associated with the first and second states. In the third state, a second set of linked symbols 312 occupies the active award region 310 and a second activation symbol 314 is detected, thereby resulting in a second active award region 316.

Figure 7:
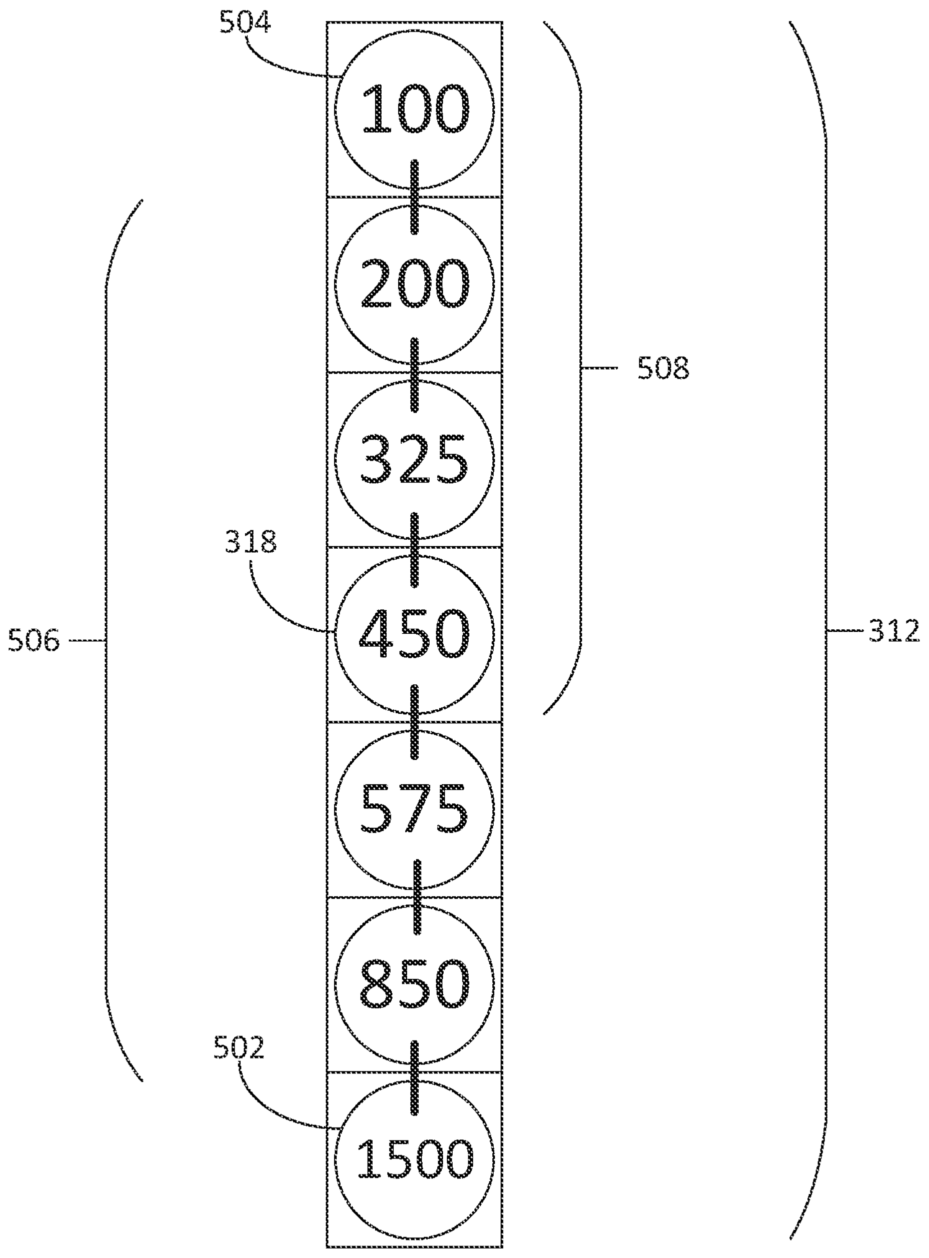
FIG. 7 is an example linked set of symbols, according to an embodiment of the present invention.

FIG. 7 depicts the linked set of symbols 312 similar to a reel strip. It is to be understood that the depiction of the linked set 312 in FIG. 7 is for illustrative purposes only and is not intended to limit the manner in which the linked symbols are organized, stored, and/or processed by the game-logic circuitry to the embodiments shown. The linked set 312 is depicted in the order in which the linked symbols are presented during a spin animation. That is, a bottom symbol 502 is presented first through the array 302 and a top symbol 504 is presented last through the array 302. In the illustrated embodiment, the linked symbols indicated by bracket 506 are visually present in the symbol array 302 in FIG. 5C. If the spin animation were to continue by one position, the bracket 506 would move upward by one position in the linked set.

In the example embodiment, a linked symbol 318 is detected by the game-logic circuitry as occupying the award region 310 (i.e., an award event) and initiates a corresponding award sequence. The game-logic circuitry determines the relationship between the detected linked symbol 318 and the other symbols within the linked set 312. More specifically, in the example embodiment, the game-logic circuitry identifies the detected symbol 318 and the linked symbols above the detected symbol 318 as awarded symbols, including those symbols not present in the array 302. The set of awarded symbols is identified in FIG. 7 by bracket 508. The award sequence includes providing an award for the awarded symbols 508. As the awarded symbols 508 are only value-bearing symbols, the provided award is an aggregate award of the award values indicated by the awarded symbols 508. In the illustrated example, the aggregate award is 1,075 credits. In other embodiments, the provided award may include additional or alternative mathematical and/or logical operations, such as applying a multiplier to the award values. Presentation of the award sequence may include, for example, visually depicting each awarded symbol 508 entering the award region 310, updating the award based on the symbol currently within the award region 310, and removing the symbol from the interface 300 to enable subsequent awarded symbols 508 to be presented. Other suitable animations and/or presentation elements may be used to visually indicate the awarded symbols 508 and the corresponding award.

The remaining linked symbols below the detected symbol 318 are not associated with the award of the award sequence. That is, the award values of the unawarded symbols are not included in the award. In certain embodiments, the unawarded symbols may be used for an additional function, such as, and without limitation, accumulating free spins, triggering a bonus game, generating multipliers, and the like. In one example, a portion of the aggregated award value of the unawarded symbols is included in the award.

As the division between awarded and unawarded symbols is relative, the number of symbols included in either category varies based on the relative position of the detected symbol 318. That is, in the example embodiment, if the bottom symbol 502 occupied the award region 310, the entire linked set 312 would be awarded. However, if the top symbol 504 occupied the award region 310, then only the top symbol 504 would be awarded. It is to be understood that the division between awarded and unawarded symbols may be different for other embodiments. In one example, the detected symbol 318 is not included in the awarded symbols 508. In another example, the awarded symbols 508 may be the symbols below the detected symbol 318 rather than the linked symbols above. In further examples, other relative positional relationships may be used to distinguish between awarded and unawarded symbols (e.g., "left" and "right").

Figure 5D:
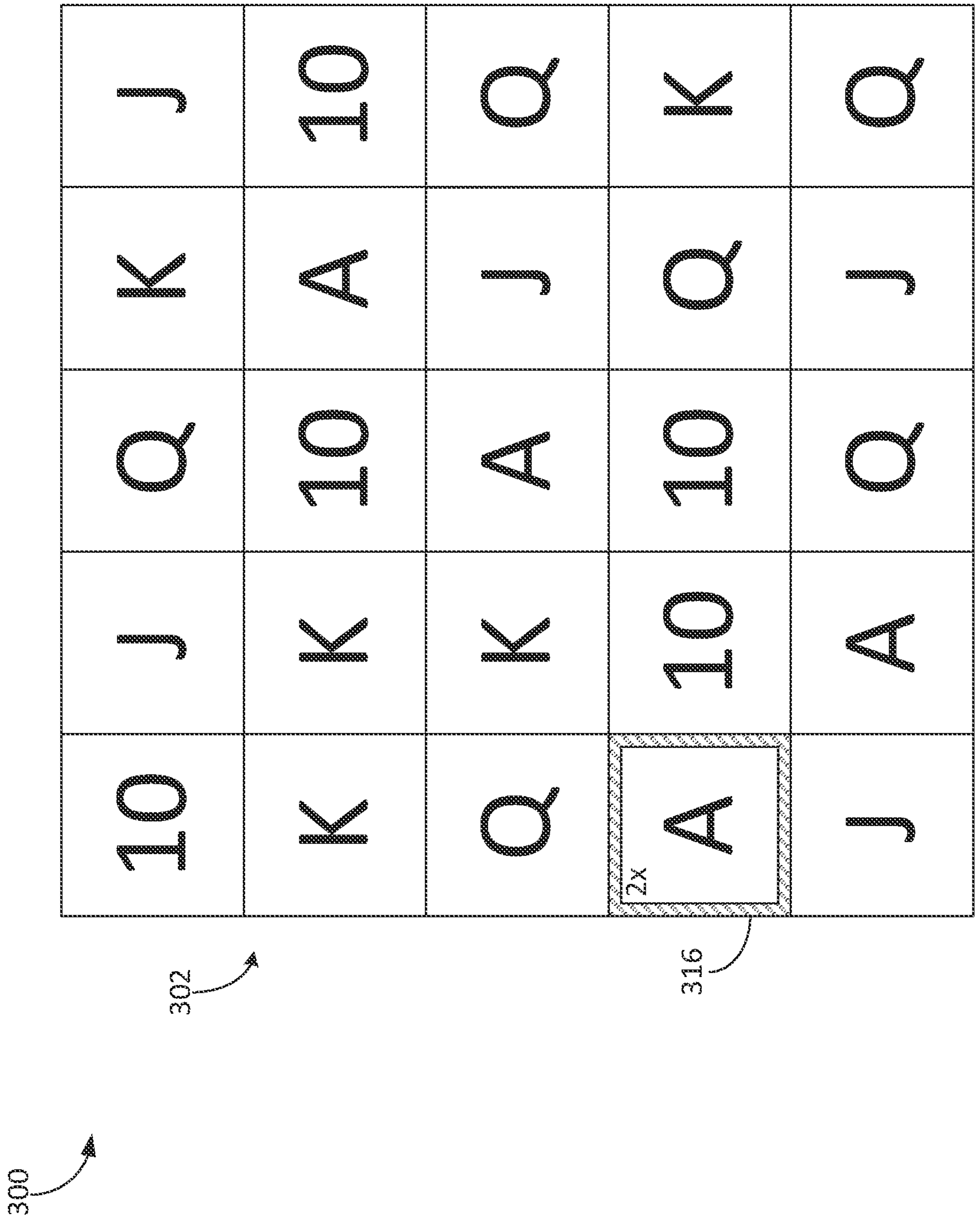
FIG. 5D is the game interface of FIG. 5A in a fourth game state, according to an embodiment of the present invention.

FIG. 5D depicts the game interface 300 in a fourth state following the third state. The fourth state presents a game outcome following the game outcome associated with the third state. In the example embodiment, the award region 310 has been removed (i.e., inactivated) following the award sequence. In other embodiments, the award region 310 may be extended by the activation of the second award region 316 in the third state. In further embodiments, the award region 310 persists irrespective of the other award region and/or the award sequence.

In the fourth state, no new activation symbols occupy the symbol array 302, and no linked set of symbols occupy the second award region 316. The second award region 316 illustrates an award region with a duration of a plurality of outcomes and a corresponding modifier. More specifically, in the example embodiment, the second award region 316 persists for three game outcomes, and the region 316 includes a multiplier that is applied to an award associated with the award region 316. In other embodiments, award regions may persist for a different number of game outcomes (or other countable game events) and/or include additional or alternative modifiers, including multipliers that behave different from the multiplier of the region 316 as described herein. In certain embodiments, different types of award regions are generated based on the activation event (e.g., different activation symbols) that have varying durations and modifiers.

In the example embodiment, the multiplier of the award region 316 is initiated at a 1× multiplier and is increment for each subsequent game outcome. The game outcome associated with the fourth state is the second game outcome with the second award region 316 being active (i.e., one intermediate game outcome has occurred between the third and fourth states), and therefore the multiplier has been increased to a 2× multiplier. The current multiplier and/or the remaining duration of the award region 316 may be indicated through visual changes to the game interface 300. In the example embodiment, the region 316 includes multiplier indicia 320 to visually indicate multipliers greater than 1× to the player. Other suitable indicia, presentation elements, and/or animations may be used in other embodiments.

In the example embodiment, the multiplier of the award region 316 is applied to the aggregated award of a linked set of symbols occupying the award region 316. In other embodiments, the multiplier may be applied to a portion of the award values of the awarded symbols. For example, the multiplier may be limited to the symbol detected in the award region 316.

Figure 8:
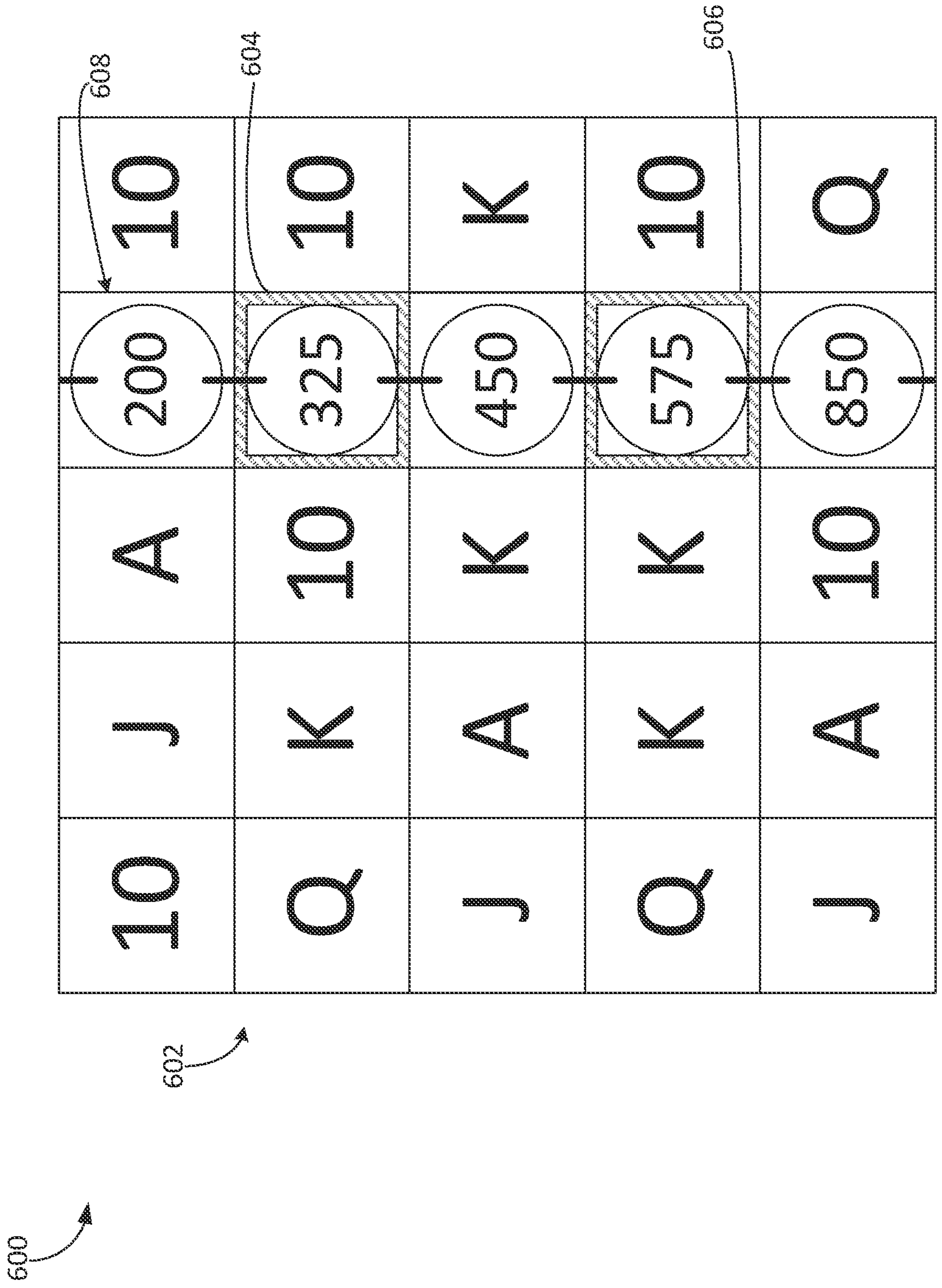
FIG. 8 is a game interface for an example game feature with two active award regions, according to an embodiment of the present invention.

FIG. 8 depicts a game interface 600 for an example game feature. The game interface 600 is presented by a presentation assembly based on instructions from game-logic circuitry of a gaming system. The game interface 600 and the associated game feature are similar to the game interface 300 and game feature of FIGS. 5A-5D. The game interface 600 depicts an example game outcome, where a plurality of symbols populates a symbol array 602. The game interface 600 includes a first award region 604 and a second award region 606 within the same column of the array 602.

In the example embodiment, a linked set of symbols 608 (which, for exemplary purposes, matches the configuration of the linked set of symbols 312, shown in FIG. 7) is detected within both award regions 604, 606. Similar to the game feature of FIGS. 5A-5D, linked symbols above and within an award region are used to determine an award for the award event (i.e., detecting a linked symbol in the award region). In some embodiments, the awards for the award regions 604, 606 are determined irrespective of each other. That is, symbols above both award regions 604, 606 are independently applied to the awards of both award regions 604, 606. The bottom award region 606, in addition to the awarded symbols of the top award region 604, includes the linked symbols between the two regions 604, 606 and the symbol within the award region 606. In other embodiments, the awards are determined such that each linked symbol can only be included in the award of one award region at a time such that the award value of a linked symbol is awarded once rather than duplicated to each applicable award region. In such embodiments, the linked symbols above and within the top award region 604 are aggregated or otherwise combined similar to the award described in FIGS. 5A-5D. However, for the bottom award region 606, the awarded symbols for the top award region are unavailable, and the awarded symbols for the bottom award region 606 include symbols between the two award regions 604, 606 and the symbol within the bottom award region 606. In further embodiments, other suitable mathematical and/or logical operations may be used to determine awards for overlapping award regions. In one example, a multiplier or other modifier is applied to bottom award region 606 to enhance the limited awarded symbols between the two award regions 604, 606. In another example, a portion of the aggregate award from the top award region 604 is applied to the aggregate award of the bottom award region 606.

The foregoing systems and methods are configured to provide and present a game feature using award regions and linked sets of symbols. However, in other embodiments, the award regions may be used to trigger other suitable award sequences without the use of linked sets of symbols. The systems and methods described herein incorporate the award regions with a picking game (i.e., an award selected from a plurality of awards randomly, semi-randomly, or manually), wherein the available selections are determined by the type of award region.

Figure 9:
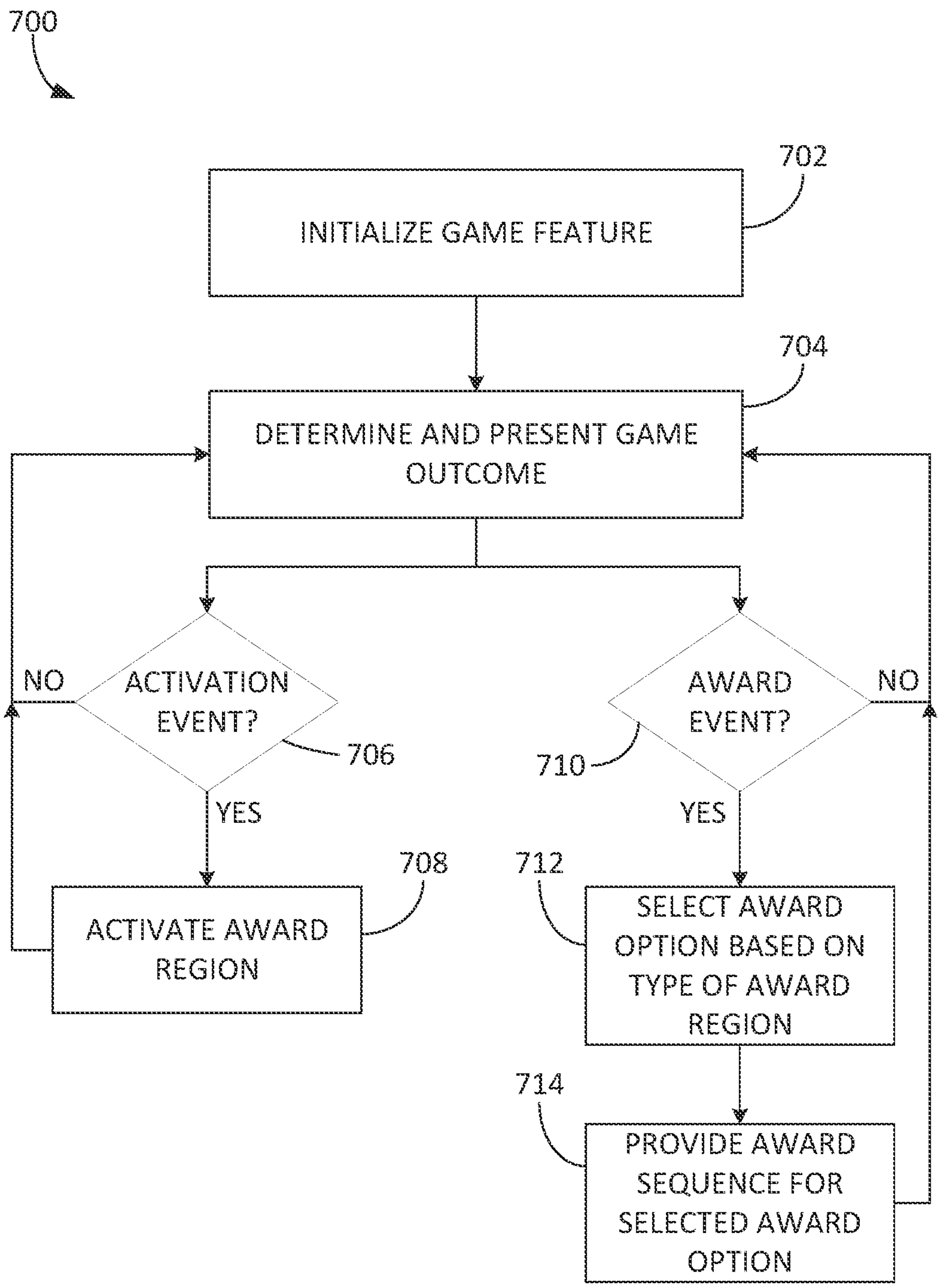
FIG. 9 is a flow diagram of an example method for conducting a game feature with selective award options, according to an embodiment of the present invention.

FIG. 9 depicts a flow diagram of a method 700 for conducting and presenting a game feature using a gaming system (e.g., the system shown in FIG. 2). The method 700 is at least partially performed by game-logic circuitry of the system and a presentation assembly of a gaming machine. In other embodiments, the method 700 includes additional, fewer, or alternative steps performed by a suitable configuration of devices of the gaming system (including configurations other than the example game-logic circuitry and presentation assembly described with respect to FIG. 9), including those steps and/or configurations described elsewhere herein.

In the example embodiment, at step 702, the game feature is initialized. Similar to the game feature described in FIG. 3, the game feature is a base game feature that is initialized by the player beginning a gaming session at the gaming machine and establishing a credit balance. In other embodiments, the game feature is a bonus game feature that is initiated in response to a bonus game trigger event within another game feature (e.g., a threshold number of bonus trigger symbols is detected in a base game feature). In certain embodiments, some games may include both a base game and bonus game feature that share similar functionality as described herein. In such embodiments, the bonus game feature may include one or more changes from the base game feature to enhance the awards provided and/or enhance the probability of obtaining awards.

Initiating the game feature includes initiating a game interface to present the gameplay described herein. In the example embodiment the game interface includes a symbol array and a plurality of selectable award options. The selectable award options may be presented with the symbol array or is hidden or partially hidden until a game event causes an award to be provided from the selectable award options. The selectable award options may include any suitable award for the game feature, such as, and without limitation, credit awards, free spin awards, modifiers, jackpot awards, and the like. In certain embodiments, one or more award options may include a plurality of awards. The award associated with each selectable award option may be presented through award indicia included with the award option. In some embodiments, the award indicia are hidden or partially obscured until the corresponding award option is selected. In other embodiments, the selectable award options do not include award indicia. Rather, the corresponding award is presented through other suitable presentation elements and/or animations of the presentation assembly.

The awards of the selectable award options may be predefined and/or dynamically determined. In one example, the selectable award options may be categorized into low, medium, and high value awards, and the award for each award options is randomly selected from a range or set of available awards based on the corresponding award category. In another example, the awards may be predefined and include progressive jackpot awards that are dynamically funded and awarded through play of the game. As described below, the selectable award options may be divided into a plurality of subsets. The subsets may be distinctive from each other, or the subsets may partially overlap one or more other subsets. In one example, a subset including all of the selectable award options may overlap two subsets that are distinct from each other. The different subsets may be identified through animations, presentation elements, and/or visual characteristics provided by the presentation assembly with the selectable award options. This visual distinctions may remain present throughout the presentation of the selectable award options or are presented in response to certain game events, such as activation of award regions or detection of award events associated with a particular subset.

At step 704, the game-logic circuitry generates a game outcome and causes the presentation assembly to present the generated game outcome. More specifically, the game-logic circuitry randomly selects symbols from one or more sets of available symbols (e.g., symbol-bearing reel strips) to populate the symbol array. The population of the symbol array may be presented with one or more animations, such as a spinning animation, that stop on the symbols of the generated game outcome to visually indicate the symbols to the player.

Based on the symbols of the game outcome, the game-logic circuitry performs one or more determinations to detect any game events within the game outcome. For example, predefined combinations of symbols are defined as winning outcomes (e.g., scatter pays or line pays), and the game-logic circuitry analyzes the symbols for any winning combinations. If a winning combination is detected, the game-logic circuitry is configured to cause the presentation assembly to provide a corresponding award through an award sequence, where the credit balance of the player is updated in response to the award. It is to be understood that multiple award sequences, including those described herein for the following steps of the method 700, may be combined and/or altered to present multiple awards in combination.

At step 706, the game-logic circuitry determines if an activation event has occurred in the game outcome. In the example embodiment, the activation event of the method 700 is similar to the activation event of the method 100 shown in FIG. 3. More specifically, the game-logic circuitry determines whether or not an activation symbol is present within the symbol array. The activation symbol may be dedicated to identifying activation events or include additional functionality, such as functioning as a wild symbol in determining winning outcomes. In other embodiments, other suitable activation events, such as the presence of a plurality of activation symbols, may be used.

If no activation event is determined to have occurred, the game-logic circuitry proceeds with any remaining game outcome determinations and/or to generate the next game outcome. However, if an activation event is detected, the game-logic circuitry proceeds to step 708. More specifically, the game-logic circuitry activates an award region within the symbol array based on the type of activation event. In the example embodiment, multiple types of activation symbols are present in the one or more sets of available symbols, where each type of activation symbol has a corresponding award region type. In other embodiments, in addition to or in place of activation symbol types, the award regions may be modified through additional activation events and/or other game events. The different types of activation symbols and/or award regions may be visually distinctive from the other types through different animations, presentation elements, and/or visual characteristics. In one example, the different types of award regions are indicated by different colors of the award regions.

Similar to the award regions of FIGS. 3 and 4, the award regions include a limited duration and, in certain embodiments, one or more modifiers. The duration is one or more subsequent game outcomes or other countable game events. The duration may be dynamically extended or terminated in response to certain game events. For example, the award region may be extended in response to new activation events occurring while the aware region is active. In another example, an award event associated with the award region (or another active award region) may terminate the award region irrespective of the remaining duration. The modifier may be static through the duration of the award region or dynamic, where the modifier increases, decreases, or otherwise changes throughout the duration of the award region. In one example, the modifier is a multiplier, and the multiplier is incremented for each game outcome that the award region is active.

Although not shown in FIG. 9, the game-logic circuitry is configured to extend and remove award regions using steps similar to the steps shown in FIG. 4. That is, the game-logic circuitry is configured to detect extension events from the game outcome and/or determine if the duration of an award region has expired. Removal of the award region may include visually hiding the award region or altering the visual appearance of the award region to indicate the inactive state of the region.

In addition to detecting activation events, the game-logic circuitry is configured to detect award events associated with active award regions at step 710. In the example embodiment, the award event includes an award symbol occupying an active award region. The award symbol may be dedicated to triggering award events or may include additional functions. In one example, the award symbol is used to determine winning outcomes. In another example, the award symbol includes a modifier that impacts an award provided based on the award event as described herein. In certain embodiments, each type of award region has a respective type of award symbol such that award events include an award symbol occupying an award region of a matching type. In other embodiments, the award regions may be matched with several types of award symbols or vice versa. If no award event is detected in a game outcome, the game-logic circuitry proceeds to any remaining game outcome determinations and/or the next game outcome.

If an award event is detected at step 710, the game-logic circuitry proceeds to step 712. More specifically, the game-logic circuitry selects one or more award options from the plurality of selectable award options based on the type of award region associated with the award event. In other embodiments, the selection is based on the type of award symbol in addition to or in place of the type of award region. In the example embodiment, the plurality of selectable award options can be organized into subsets of award options, and the subsets may overlap other subsets (e.g., one subset includes all the selectable award options while a second subset includes only a portion of the options). The award region types are associated with one or more subsets of award options such that the selection is limited to the award options within the associated subset. For example, a first award region type is associated with a first subset including a plurality of credit awards, while a second award region type is associated with a second subset including credit awards and progressive jackpot awards. Award events associated with award regions of the first region type result in an award selection from the first subset, and award events associated with the award regions of the second region type result in an award selection from the second subset. The association between an award subset and an award region type may be predefined, static, or dynamic through the game feature.

In other embodiments, in addition to or in place of defining the subset from which a selection is made, the type of award region, type of activation symbol, and/or other characteristics of the award event may result in other dynamic changes to the selection process. For example, the game-logic circuitry may determine the number of selections associated with the award event based on the award region and award symbol pairing or the number of detected award events. In certain embodiments, the subset used for the award selection may be changed in response to award event (e.g., include additional awards, alter the predefined awards, etc.).

The selection process may be random, partially random, or based on player input. In some embodiments, a random determination (e.g., by the random-number generator) is used to identify a selected award option from the corresponding subset. The random determination may be used in combination with weighting parameters (e.g., a weighted table of the available award options in the subset) to change the probability of the award options. In embodiments with player input-based selection, the award indicia of the award options may be obscured, either throughout the game feature or during the selection process, and the player is prompted to select one of the award options to reveal the corresponding award. In certain embodiments, the random or partially random selection is performed prior to the player selection and the selection of an award option does not impact the revealed award. In other embodiments, the random determination may be used to select a limited number of award options from the subset for use in the player selection such that the player selection is not from the full subset. Instead, the player (potentially unknowingly, for award options with hidden indicia) selects from the randomly determined limited number of award options.

The selection process is visually presented to the player through one or more animations and/or presentation elements provided by the presentation assembly. The selection process in the example embodiment causes the presentation assembly to initiate an award sequence at step 714. More specifically, the presentation assembly provides an award sequence for an award associated with the selected award option. In one example, the award value of the selected award option is provided directly to the credit balance of the player in the award sequence. In another example, additional award values and/or modifiers are combined with the award value of the selected award option through one or more mathematical and/or logical operations to generate the award of the award sequence. In such an example, the modifier may be presented within the award region and/or the award symbol prior to the award sequence. In certain embodiments, the award symbol is a value-bearing symbol and is combined with an award value or modifier associated with the selected award option.

In addition to providing the award to the credit balance of the player, the award sequence may include removal of the selected award option from the plurality of selectable award options. The removal may be visually indicated by changing the appearance of the award option or removing the award option from the game interface altogether. In some embodiments, the award option is replaced with a new award option (which may have the same or different award). In other embodiments, the award option is not replaced, and the corresponding subset of award options decreases in size (thereby increasing the probability of selecting one of the other award options for the same type of award event). In further embodiments, the selected award option is not removed and remains available for subsequent selection. Combinations of the embodiments described above may be used for different subsets. For example, a first subset including jackpot and high value awards may keep all of the award options while a second subset with credit awards may remove selected awards.

In some embodiments, particularly embodiments with removal of award options, the game-logic circuitry is configured to reset the plurality of award options in response to one or more game events or conditions. "Resetting" in this context means the number of award options and/or the awards of the award options are established at predefined or dynamic values. In one example, the number of award options is reset to the same, initial number of options, while the awards of at least some of the award options are randomly determined again. In another example, both the number of award options and the award values are reset to predefined values. In certain embodiments, the resetting of the award options and/or the removal of award regions is performed using a "strike" system where the game-logic circuitry detects the presence or absence of a particular game event or condition for a predefined number of times before resetting the award options or removing the award region.

In some embodiments, the absence of all active award regions from the symbol array result in the award options resetting. In certain embodiments, the number of award events and/or the number of remaining award options (in a particular subset or the plurality of award options as a whole) reaching a threshold value triggers the reset condition. Other suitable reset conditions and events may be used to enable the award option selection to continue throughout play of the game feature. In further embodiments, the plurality of award options does not reset for a particular gaming session. That is, resetting the plurality of award options is performed only in response to the termination of the current gaming session or initiation of the next gaming session.

In certain embodiments, at least some of the subsets of available award options include one available award option such that the selection process is predefined. In these embodiments, the selected award option may be configured to change to be associated with a new award. For example, selection of a first award option may cause the first award option is be updated to a new, increased award value available for subsequent selection. This progression of award values and/or other awards (e.g., a jackpot award at the end of the progression) may be predefined or partially random according to a mathematical and/or logical operation. The progression of award values may persist through the game feature or reset as described above to an initial award value. In other embodiments, the progression of award values is implemented in subsets with a plurality of award options, where the updated award values are selected from a progression of values associated with each award option or with the subset as a whole. In one or more embodiments, several progression of award values (or other awards) are available to update an award option, and the player is prompted to selected one of the progressions to update the award option or a random selection is performed.

Following the game outcome determinations, the game feature proceeds to the next game outcome, another game feature (e.g., a bonus game trigger is detected in the game outcome), and/or a payout sequence (also referred to as a "cashout sequence"). For the next game outcome, steps 704-712 are repeated. For bonus game feature embodiments, the game feature may have a limited duration, and detecting the expiration of the duration causes the game-logic circuitry transition from the bonus game feature to a base game feature. The payout sequence may include terminating the game feature and/or the gaming session, and the gaming machine is configured to provide the remaining credit balance to the player and await a subsequent gaming session.

FIGS. 10A-10E depict a game interface 800 of an example game feature similar to the game feature described with respect to FIG. 9. The game feature is presented by a presentation assembly of a gaming machine in response to processes performed game-logic circuitry of a gaming system including the gaming machine. In some embodiments, the game-logic circuitry is at least partially integrated with the gaming machine.

In the example embodiment, the game interface 800 includes a symbol array 802 and a plurality of selectable award options 804. The symbol array 802 includes a plurality of symbol positions arranged into rows and columns. The selectable award options 804 include award indicia visually indicating an award corresponding to each award option 804. In the illustrated embodiment, the award options 804 include credit awards and progressive jackpot awards (e.g., "MINI," "MEGA," etc.). In other embodiments, the award options 804 may include additional or alternative awards, such as free spins, bonus game triggers, and the like. In some embodiments, rather than presenting award indicia for all of the award options 804 on the game interface 800, the award indicia may be hidden or otherwise obscured until a corresponding game event is detected. For example, the award indicia of a given award option 804 may be hidden until the award option 804 is selected as described herein.

In the example embodiment, the award options 804 are divided into two subsets 806, 808. The different subsets 806, 808 are indicated by different dashed borders. As described herein, the different subsets 806, 808 are associated with different types of award events as described herein. In certain embodiments, a third type of award event may be associated with both the subsets of the award options 806, 808.

In other embodiments, the game interface 800 includes additional, fewer, or alternative presentation elements and/or animations, including those described elsewhere herein. The configuration of the game interface 800 can be adjusted or altered according to the desired visual and/or game configuration of the game feature. For example, the appearance of the award options 804 may use color to distinguish between subsets 806, 808. In another example, the symbol array 802 may include more or less symbols and/or arrange the symbol positions in a different configuration. Other suitable alterations to the game interface 800 that maintain the general functionality of the game feature described herein are considered within the spirit and scope of the present disclosure.

Figure 10A:
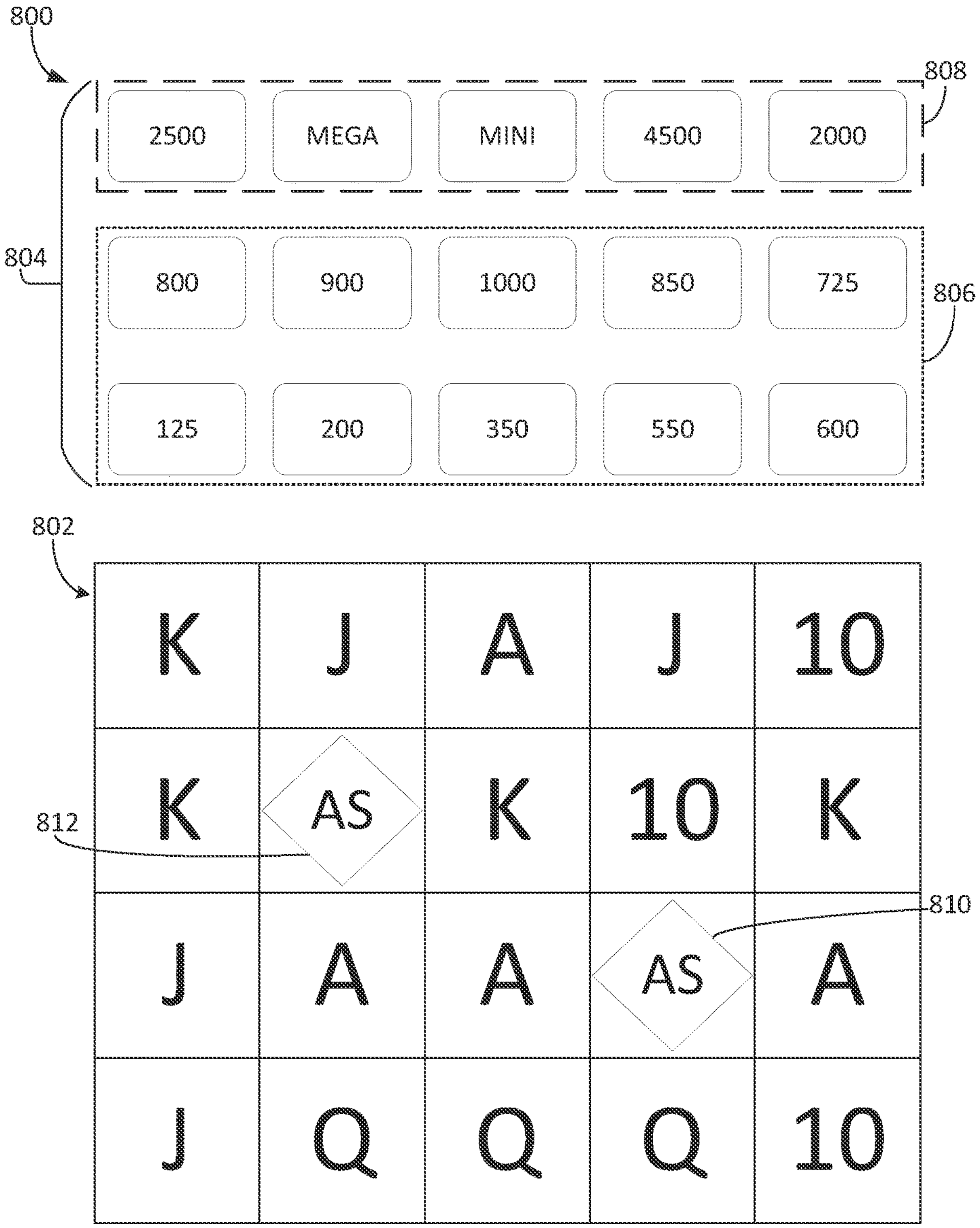
FIG. 10A is a game interface of an example game feature in a first game state, according to an embodiment of the present invention.

FIG. 10A depicts the game interface 800 in a first state. The first state is at the conclusion of a first game outcome. The first game outcome includes populating the symbol array 802 with a randomly selected set of symbol. In the example embodiment, the randomly selected symbols include a first activation symbol 810 and a second activation symbol 812. The first and second activation symbols 810, 812 are different types of activation symbols as indicated by the different shapes of the symbols 810, 812. In other embodiments, other suitable visual characteristics, presentation elements, and/or animations may be used in addition to or in place of the different shapes to identify different activation symbol types. For example, the activation symbols 810, 812 may be presented using different colors. The different activation symbols 810, 812 result in two different types of activation events.

Figure 10B:
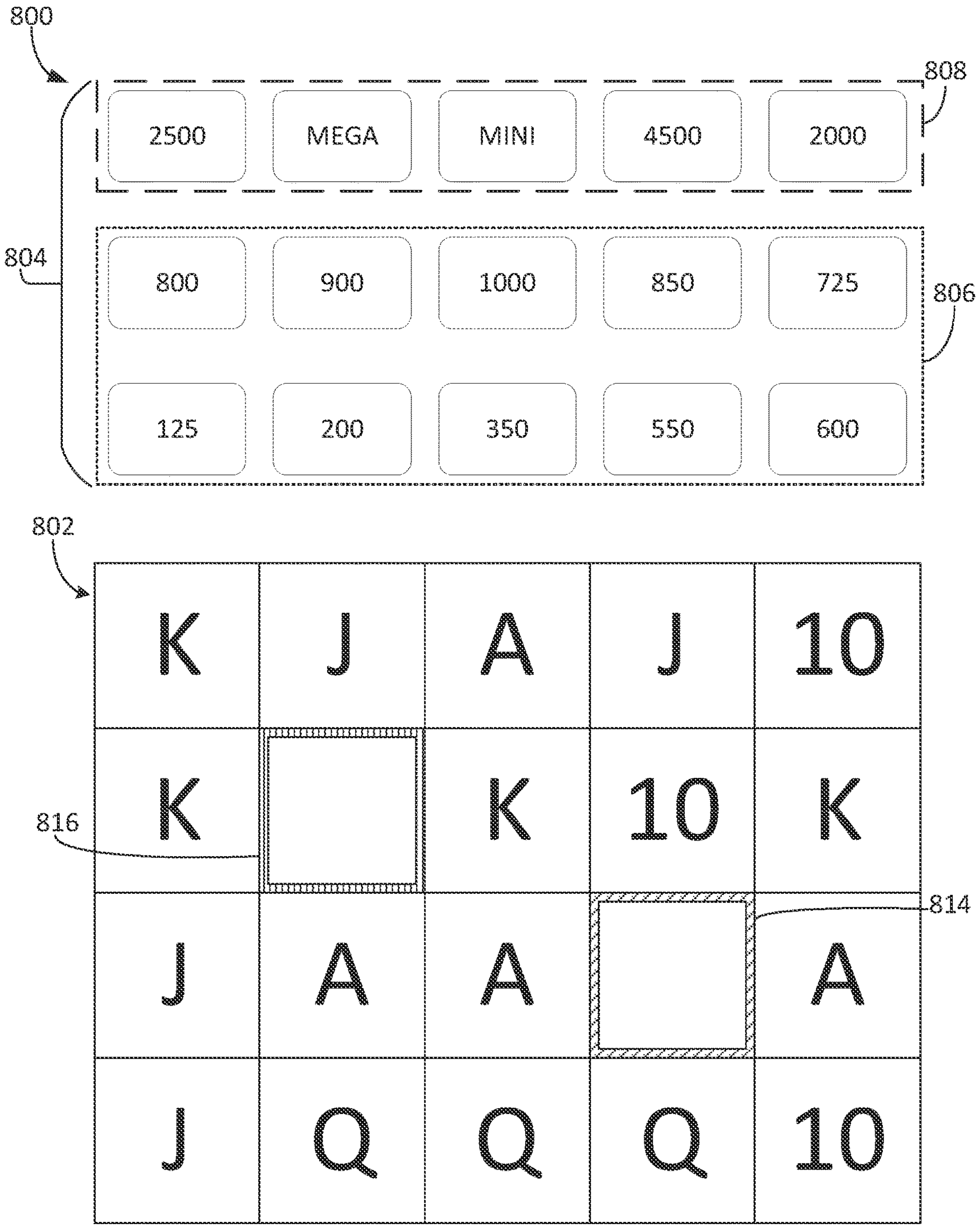
FIG. 10B is the game interface of FIG. 10A in a second game state, according to an embodiment of the present invention.

In response to the game-logic circuitry detecting the activation symbols 810, 812 (i.e., detecting two activation events), the game-logic circuitry is configured to activate corresponding award regions based on the type of activation symbol. FIG. 10B depicts the game interface 800 in a second state following the first state. More specifically, in the second state, a first award region 814 is activated for the first activation symbol 810, and a second award region 816 is activated for the second activation symbol 812. Based on the different activation symbol types, the award regions 814, 816 have different, corresponding award region types. The different award region types are visually indicated in the illustrated embodiment as different border patterns, where the border shown for the first award region 814 is associated with a first region type, and the border shown for the second award region 816 is associated with a second region type. In other embodiments, other suitable visual distinctions may be used to distinguish between award region types.

The award regions 814, 816 are configured to persist for one or more game outcomes. In some embodiments, the award regions 814, 816 persist for at least one game outcome and can be extended to additional game outcomes in response to extension events (e.g., additional activation events, etc.). In other embodiments, the award regions 814, 816 persist for a plurality of game outcomes irrespective of any extension events. In certain embodiments, the duration of each award region 814, 816 may be different from each other.

Figure 10C:
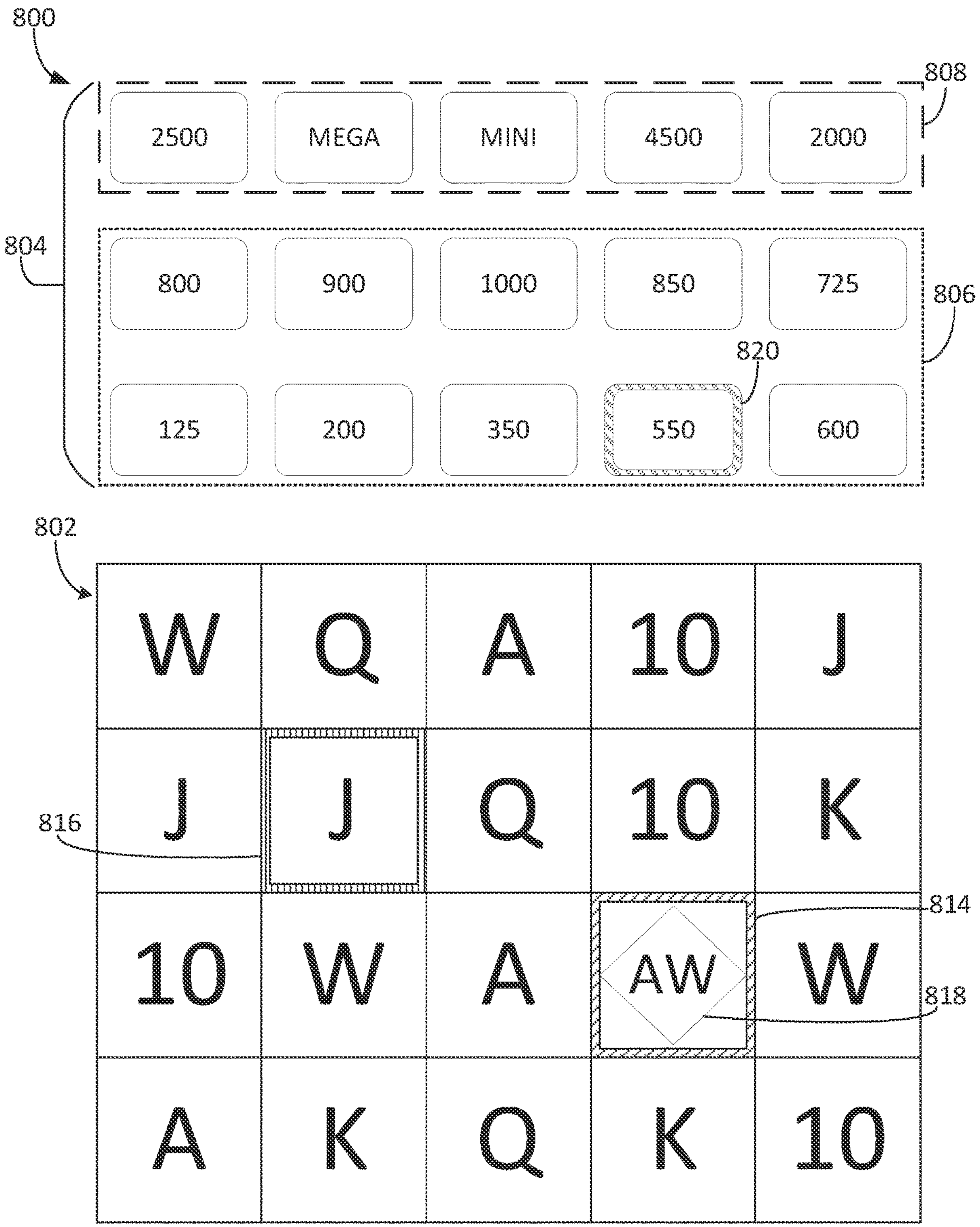
FIG. 10C is the game interface of FIG. 10A in a third game state, according to an embodiment of the present invention.

FIG. 10C depicts the game interface 800 in a third state following the second state. More specifically, the third state is a subsequent game outcome. In the subsequent game outcome, the first award region 814 is occupied by an award symbol 818, and the second award region 816 is not occupied by an award symbol. In the example embodiment, occupying the first award region 814 with the award symbol 818 is an award event that triggers a corresponding award sequence. In certain embodiments, multiple types of award symbols may be available to populate the symbol array 802, where each type of award symbol corresponds to a type of award region. That is, award symbols of a type that do not match the type of the occupied award region are not considered to be award events in some embodiments. The award sequence includes a random selection from the award options 804, where the award associated with the selected award option 804 is provided within the award sequence to the player.

The selection of an award option 804 is based at least in part on the type of award region and/or award symbol. In the example embodiment, the first award region 814 is of a first award region type that is associated with the first subset 806 of the award options 804. As a result, the selection of the award option 804 is from the first subset 806 rather than all of the award options 804. The weighting of each award option 804 within the first subset 806 may be equal (i.e., probability of selection is substantially equal between each available option 804), or weighting parameters are applied to the selections to adjust the selection probabilities.

In the illustrated embodiment, a first award option 820 is selected from the first subset 806. The selection is depicted in FIG. 10C by the border surrounding the selected award option 820. However, other suitable animations, presentation elements, and/or visual distinctions may be used to indicate the selection. In addition to the selection, the award sequence includes providing the corresponding award to the player, such as applying the credit value of the award to the credit balance of the player. In the illustrated embodiment, the award value of the selected award option 820 (i.e., 550 credits) is applied to the credit balance of the player.

In at least some embodiments, populating the second award region 816 with a corresponding award symbol results in a second award event. In response to the second award event, an award option 804 from the second subset 808 is selected to be provided as an award. The selection process may be the same as or different from the selection process for the first subset 806. In one example, the selection for the first subset 806 is unweighted random selection, while the selection for the second subset 808 is weighted random selection.

Multiple award events can be initiated for the same game outcome in some embodiments. In other embodiments, one or only a portion of the detected award events are initiated in a given game outcome. In such embodiments, the determination of which award events to initiate are based on random selection, game events, game conditions, and/or player input. In one example in which one detected award event is initiated, the award event selected may be based on the potential value of corresponding award. In the illustrated embodiment, if both award regions 814, 816 are populated by award symbols, the award event associated with the second award region 816 is initiated because the potential awards from the second subset 808 is greater relative to the awards of the first subset 806. Other suitable hierarchies between concurrent award events may be used in other embodiments.

Figure 10D:
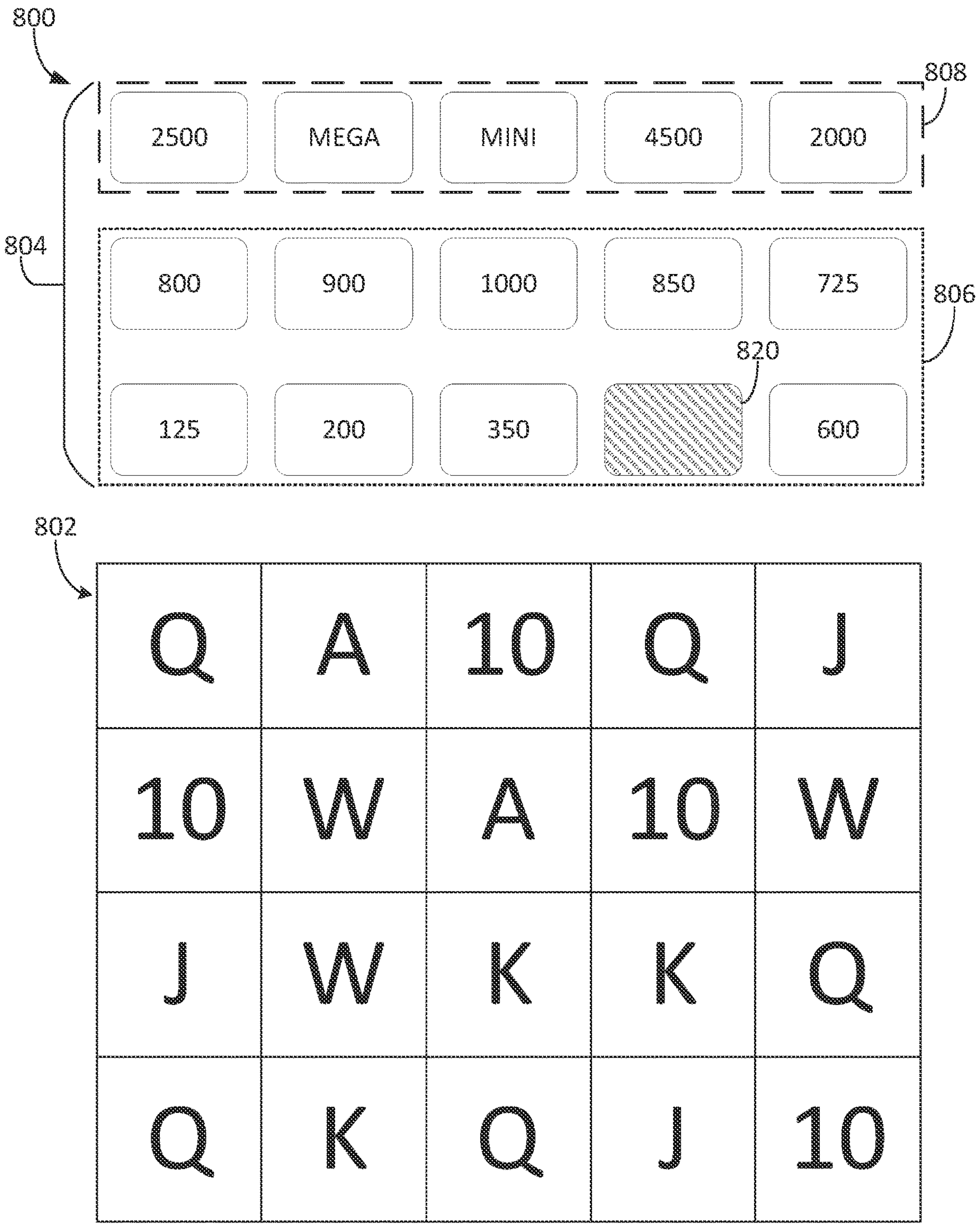
FIG. 10D is the game interface of FIG. 10A in a fourth game state, according to an embodiment of the present invention.

FIG. 10D depicts the game interface 800 in a fourth state following the third state. More specifically, the fourth state is one or more game outcomes following the third state. In the fourth state, the award regions 814, 816 have expired and are removed from the symbol array 802. Additionally, the previously selected award option 820 has been removed from the first subset 806.

In the example embodiment, the removal of the selected award option 820 is not replaced with another award option such that the number of award options within the first subset 806 is reduced. In such embodiments, if weighting parameters are applied to the award options 804 of the first subset 806, the weighting parameters are updated in response to the removal of the award option 820. The visual appearance of the removed award option 820 may be changed to visually indicate the inactive or removed state to the player, or the award option 820 is removed from the game interface 800 is removed altogether. In embodiments with the award options 820 being removed from the game interface 800, the presentation assembly may be configured to update the positioning and/or appearance of the remaining award options 804 on the game interface 800.

In other embodiments, the selected award option 820 is replaced with another award option 804. That is, a new award value is assigned to the award option 820 for subsequent selection. As a result, the number of award options 806 remains the same and the probability of selecting each award option 804 is the same. In certain embodiments with weighted selection, the weighting of the award options 804 may change in response to replacing the award option 820. In other embodiments, the selected award option 820 is replaced with an award option in a different subset. For example, in such an embodiment, the replacement award option for the selected award option 820 is moved from the first subset 806 to the second subset 808. As a result of the move between subsets, the corresponding award of the replacement award option may be based on the rules or parameters of the destination subset (i.e., the second subset 808 has greater relative award values or jackpot awards, and the replacement award option is assigned an award value similar to the awards of the second subset 808). In at least one embodiment, the replacement award option (and/or other award options) does not include any award value.

It is to be understood that the game feature described with respect to FIGS. 10A-10D is not intended to limit to the functionality and/or presentation of the present disclosure. That is, other suitable embodiments with different functions and/or presentation may be used for the game feature. In one example, the award symbols are value-bearing symbols, and the award options include modifiers and/or award values that are applied to the value of the award symbols to generate an award for the award sequence. In another example, the award options are not presented as discrete presentation elements, but rather are presented together within one or more presentation elements, such as an award-bearing reel strip or an award wheel.

Figure 11:
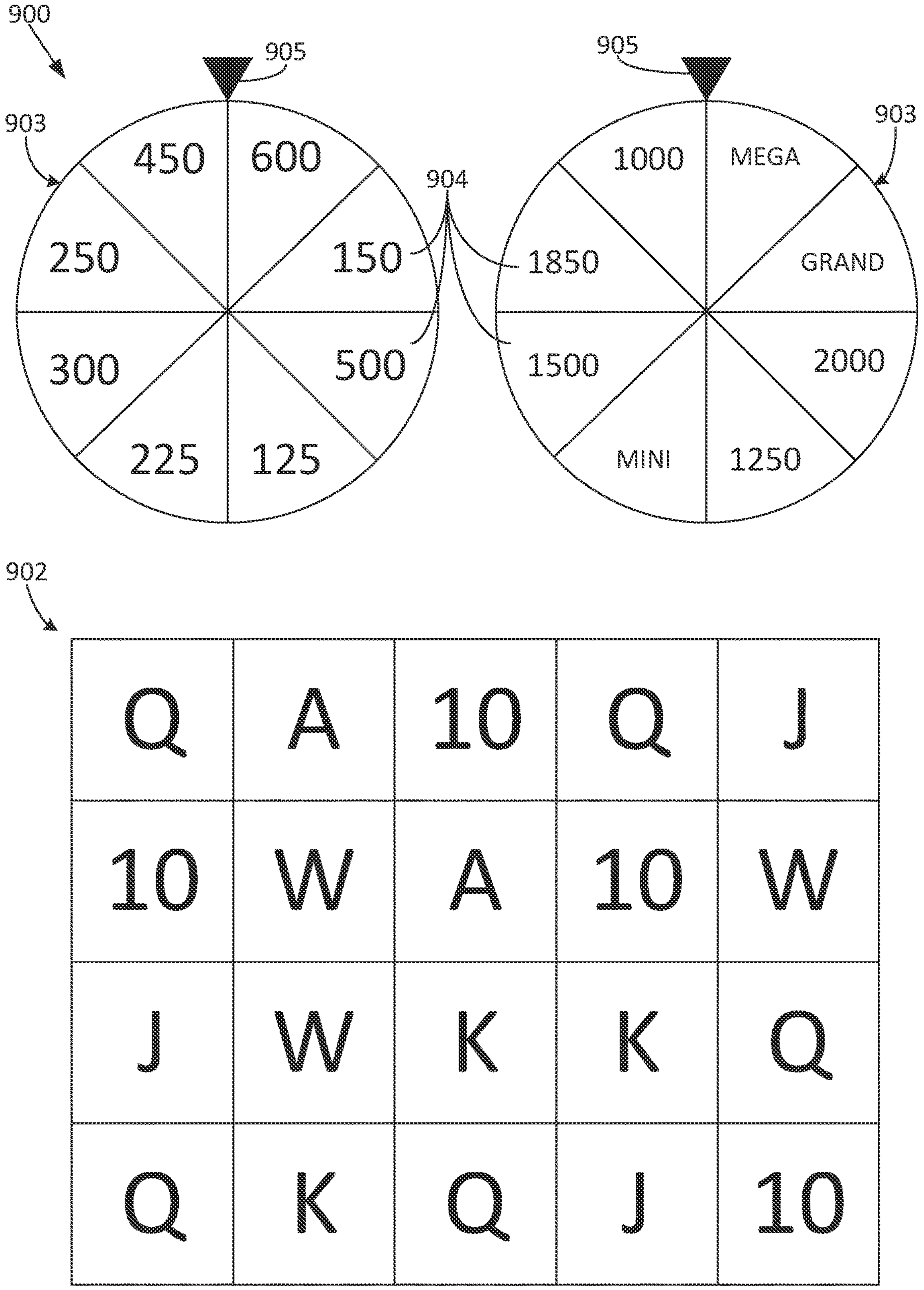
FIG. 11 is a game interface of an example game feature with award wheels, according to an embodiment of the present invention.

FIG. 11 depicts a game interface 900 for an example game feature provided by a gaming system (e.g., the system shown in FIGS. 1 and 2). The game feature is the same or similar to the game features of FIGS. 9-10D beyond the noted differences below. The game interface, similar to the game interface 800 shown in FIGS. 10A-10D, includes a symbol array 902.

However, unlike the game interface 800, the game interface 900 includes a plurality of award options 904 within a pair of award wheels 903. More specifically, each award option 904 is represented as a wedge or a discrete portion of the wheels 903. In the example embodiment, the award wheels 903 represent different award subsets such that each award wheel 903 is associated with different award events (e.g., different award regions and/or award symbols). In other embodiments, the award subsets do not have separate award wheels 903, but rather the award subsets form separate portions of a single award wheel 903. The award subsets may be intermixed with other subsets or the subsets may form discrete portions of the wheel 903. In certain embodiments, each wedge of the award wheel 903 is associated with one award option 904 from each award subset such that different awards for a given wheel wedge based on the type of award event.

In the example embodiment, the award sequence includes selecting an award option 904 from one of the award wheels 903 based on a corresponding award event. The selection performed by the game-logic circuitry may be the same or similar to the selection described with respect to FIGS. 9-10D. In some embodiments, the visual size of each award option 904 matches or is based on the underlying probability of selection of the award option relative to the other award options 904 of the award wheel 903. In other embodiments, the visual size of one or more award options 904 (e.g., all options 904) may be untethered from underlying selection probability.

The presentation of the selection includes any suitable presentation elements, animations, and the like to visually indicate to the player which award option 904 has been selected. In the example embodiment, the award wheel 903 includes a selector 905 used to indicate the selected award option 904. Other suitable forms of the selector 905 may be used to indicate the selected award option 904. For example, the selector 905 may be a presentation element overlaid upon the award wheel 903. The presentation assembly may be configured to animate the award wheel 903 and/or the selector 905 (e.g., spinning animations) to indicate the selection. In other embodiments, the award wheel 903 and/or other suitable presentation elements are configured to visually indicate the selection of an award option 904 without the use of the selector 905.

In some embodiments, similar to the award options 804 shown in FIGS. 10A-10D, the selected award option 904 is removed from the award wheel 903. The removal may include inactivating the selected award option 904 while keeping the inactive award option 904 on the award wheel 903. That is, the selected award option 904 visually remains on the award wheel 903 but is either not available for subsequent selection or provides no award for subsequent selection. In other embodiments, the removal may include visually removed the selected award option 904 from the award wheel 903. In such embodiments, the remaining award options 904 may be updated to fill the gap left by the award option or remain the same size such that the gap in the award wheel 903 remains or is filled by a new award option 904. Changes to the visual size or the available award options may also change the underlying weight parameters of the award options 904.

In further embodiments, the selected award option 904 remains on the award wheel 903 after selection such that subsequent selection is possible. In such embodiments, the award of the award option 904 remains the same or changes to a new award. For example, each award option 904 may include a set of award values, where each selection causes the award option 904 to progress to a new award of the set (which may increase in value or provide additional awards relative to the previous award within the set).

In the embodiments disclosed herein, each value-bearing symbol may be assigned a credit value that is displayed upon the symbol. The credit value may, for example, range from a minimum credit value to a maximum credit value and be based on the total amount wagered on the game. For example, if a player wagers a minimum of 100 credits, the assigned credit value may range from 100 to 1000 credits. And if a player wagers a maximum of 500 credits, the assigned credit value may proportionately increase and thereby range from 500 to 5000 credits. In some embodiments, the assigned value may be randomly selected from a list of possible multipliers of the total amount wagered on the game, for example, 1×, 2×, 3×, 4×, 5×, 10×, 15×, 20×, 50×, and 100×. In other embodiments, the value may be pre-assigned to each value-bearing symbol as part of the reel strip layouts of the game reels. In still other embodiments, the assigned value may be randomly selected before, during, or at the conclusion of a reel spin.

As disclosed in the embodiments herein, awards may be provided for each game outcome based on at least the remaining symbols. For example, line pays and scatter pays may be awarded for each game cycle outcome based on the symbols populating the symbol array. In some embodiments, the value-bearing symbols may not be associated with awards outside of the features described herein. In other embodiments, the value-bearing symbols may be included within line pays, scatter pays, and/or other suitable awards. For example, the value-bearing symbols may be treated as a special symbol, such as a wild symbol.

While the embodiments are largely described within the context of a base game, it is equally contemplated that the disclosed embodiments can be practiced within the context of a free game bonus without a wager between free game cycles.

The embodiments of the present invention provide an innovative procedure for collecting and selecting values of symbols in a symbol array. Game-logic circuitry executing instructions in accordance with the embodiments present a visual display of spinning reels with clearly enumerated symbology that combine in readily understood arrangements to increase in value and/or are translated to award elements (e.g., an award wheel) for subsequent selection. An observer experiences excitement and anticipation as new symbols land in the array, values are collected within the award elements, and award trigger events initiate an award sequence selecting one of the values from the award elements. In stark contrast to conventional reel-spinning games in which symbol images are evaluated for winning combinations by paytable rules, the disclosed embodiments provides immediately recognizable values in WYSIWYG display configurations while adding variability as to how the values to be awarded to the player are collected and selected from the award elements.

The value-collection and selection procedure may be symbol- and game-agnostic. Themes and imagery of symbols and environment may be varied with no effect on the value-award process. Or, if so desired, the criteria for value-award may be modified in innumerable ways to produce new visual/animation effects and exciting summation sequences.

Further benefits are realized in increased computer processing efficiency, fewer rules to be evaluated, and simpler graphical representations. For example, in a conventional paytable evaluation, overlapping payline sections require multiple evaluation steps. Often, analysis is required to determine which payline results in the highest credit total, with the lesser value paylines being discarded but only after being evaluated-all this adds to processing overhead. Special symbols like wilds, multipliers, and scatter symbols can modify paytable values and may require separate, additional evaluation according to customized rule sets. All these procedures can be inherently more complex than simple collection of number values and a random selection from the collected values. The embodiments disclosed herein represents a win-win: simpler, almost self-explanatory graphics combined with faster, more efficient processing. The inventive value-award procedure can be implemented on the vast majority of casino gaming machines without requiring upgrades or modifications.

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming machine comprising:

a presentation assembly configured to present a plurality of symbol positions; and game-logic circuitry in communication with the presentation assembly, the game-logic circuitry configured to:

in response to an activation event, cause the presentation assembly to visually associate a first symbol position of the plurality of symbol positions with an award region;

cause the presentation assembly to present a subsequent game outcome after the activation event by populating the plurality of symbol positions with randomly selected symbols, wherein the visual association between the first symbol position and the award region remains visible during the subsequent game outcome;

detect whether or not a symbol of a linked symbol group occupies the first symbol position of the award region in the subsequent game outcome, the linked symbol group including a plurality of value-bearing symbols visually linked together when presented by the presentation assembly, wherein each value-bearing symbol of the linked symbol group includes a respective position within the linked symbol group and award indicia visibly indicating a corresponding award value; and in response to detecting a first value-bearing symbol of the linked symbol group occupies the first symbol position while the award region is active, cause the presentation assembly to present an award animation sequence for the award values of at least one value-bearing symbol within the linked symbol group based at least in part on the position of the first value-bearing symbol relative to the positions of other value-bearing symbols within the linked symbol group, the award animation sequence including visibly distinguishing the at least one value-bearing symbol from any value-bearing symbols within the linked group that are unassociated with the award animation sequence, wherein the at least one value-bearing symbol includes a value-bearing symbol of the linked symbol group that is initially hidden from the plurality of symbol positions during the subsequent game outcome.

2. The gaming machine of claim 1, wherein the randomly selected symbols are selected from a plurality of symbol-bearing reel strips, and wherein a first reel strip of the plurality of symbol-bearing reel strips is associated with at least the first symbol position and includes the linked symbol group, the linked symbol group stored as adjacent symbols on the first reel strip.

3. The gaming machine of claim 2, wherein the at least one value-bearing symbol associated with the award animation sequence includes the first value-bearing symbol and any value-bearing symbols of the linked symbol group in a predetermined direction along the first reel strip.

4. The gaming machine of claim 1, wherein the at least one value-bearing symbol associated with the award animation sequence includes value-bearing symbols of the linked symbol group presented above the first value-bearing symbol based on the respective positions of the value-bearing symbols.

5. The gaming machine of claim 1, wherein the award region has a duration, and wherein the game-logic circuitry is configured to remove the award region in response to detecting expiration of the duration.

6. The gaming machine of claim 5, wherein the duration of the award region is extended in response to at least one of additional activation events or linked symbol groups occupying the award region.

7. The gaming machine of claim 1, wherein the award animation sequence includes visibly distinguishing the at least one value-bearing symbols from the unassociated value-bearing symbols by animating, via the presentation assembly, the at least one value-bearing symbol to move into the award region and visibly collecting the award values of each of the at least one value-bearing symbol in response to the respective value-bearing symbol entering the award region.

8. A method for conducting and presenting a game feature using a gaming system, the gaming system comprising a presentation assembly of a gaming machine and game-logic circuitry in communication with the presentation assembly, the method comprising:

presenting, by the presentation assembly, a plurality of symbol positions;

causing, by the game-logic circuitry in response to an activation event, the presentation assembly to visually associate a first symbol position of the plurality of symbol positions with an award region;

causing, by the game-logic circuitry, the presentation assembly to present a subsequent game outcome after the activation event by populating the plurality of symbol positions with randomly selected symbols, wherein the visual association between the first symbol position and the award region remains visible during the subsequent game outcome;

detecting, by the game-logic circuitry, whether or not a symbol of a linked symbol group occupies the first symbol position of the award region in the subsequent game outcome, the linked symbol group including a plurality of value-bearing symbols visually linked together when presented by the presentation assembly, wherein each value-bearing symbol of the linked symbol group includes a respective position within the linked symbol group and award indicia visibly indicating a corresponding award value; and causing, by the game-logic circuitry in response to detecting a first value-bearing symbol of the linked symbol group occupies the first symbol position while the award region is active, the presentation assembly to present an award animation sequence for the award values of at least one value-bearing symbol within the linked symbol group based at least in part on the position of the first value-bearing symbol relative to the positions of other value-bearing symbols within the linked symbol group, the award animation sequence including visibly distinguishing the at least one value-bearing symbol from any value-bearing symbols within the linked group that are unassociated with the award animation sequence, wherein the at least one value-bearing symbol includes a value-bearing symbol of the linked symbol group that is initially hidden from the plurality of symbol positions during the subsequent game outcome.

9. The method of claim 8, wherein the randomly selected symbols are selected from a plurality of symbol-bearing reel strips, and wherein a first reel strip of the plurality of symbol-bearing reel strips is associated with at least the first symbol position and includes the linked symbol group, the linked symbol group stored as adjacent symbols on the first reel strip.

10. The method of claim 9, wherein the at least one value-bearing symbol associated with the award animation sequence includes the first value-bearing symbol and any value-bearing symbols of the linked symbol group in a predetermined direction along the first reel strip.

11. The method of claim 8, wherein the at least one value-bearing symbol associated with the award animation sequence includes value-bearing symbols of the linked symbol group presented above the first value-bearing symbol based on the respective positions of the value-bearing symbols.

12. The method of claim 8, wherein the award region has a duration, and wherein the game-logic circuitry is configured to remove the award region in response to detecting expiration of the duration.

13. The method of claim 12, wherein the duration of the award region is extended in response to at least one of additional activation events or linked symbol groups occupying the award region.

14. The method of claim 8, wherein the award animation sequence includes visibly distinguishing the at least one value-bearing symbols from the unassociated value-bearing symbols by animating, via the presentation assembly, the at least one value-bearing symbol to move into the award region and visibly collecting the award values of each of the at least one value-bearing symbol in response to the respective value-bearing symbol entering the award region.

15. A gaming system comprising:

a gaming machine comprising a presentation assembly configured to present a plurality of symbol positions; and game-logic circuitry in communication with the presentation assembly, the game-logic circuitry at least partially separate from the gaming machine and configured to:

in response to an activation event, cause the presentation assembly to visually associate a first symbol position of the plurality of symbol positions with an award region;

cause the presentation assembly to present a subsequent game outcome after the activation event by populating the plurality of symbol positions with randomly selected symbols, wherein the visual association between the first symbol position and the award region remains visible during the subsequent game outcome;

detect whether or not a symbol of a linked symbol group occupies the first symbol position of the award region in the subsequent game outcome, the linked symbol group including a plurality of value-bearing symbols visually linked together when presented by the presentation assembly, wherein each value-bearing symbol of the linked symbol group includes a respective position within the linked symbol group and award indicia visibly indicating a corresponding award value; and in response to detecting a first value-bearing symbol of the linked symbol group occupies the first symbol position while the award region is active, cause the presentation assembly to present an award animation sequence for the award values of at least one value-bearing symbol within the linked symbol group based at least in part on the position of the first value-bearing symbol relative to the positions of other value-bearing symbols within the linked symbol group, the award animation sequence including visibly distinguishing the at least one value-bearing symbol from any value-bearing symbols within the linked group that are unassociated with the award animation sequence, wherein the at least one value-bearing symbol includes a value-bearing symbol of the linked symbol group that is initially hidden from the plurality of symbol positions during the subsequent game outcome.

16. The gaming system of claim 15, wherein the randomly selected symbols are selected from a plurality of symbol-bearing reel strips, and wherein a first reel strip of the plurality of symbol-bearing reel strips is associated with at least the first symbol position and includes the linked symbol group, the linked symbol group stored as adjacent symbols on the first reel strip.

17. The gaming system of claim 16, wherein the at least one value-bearing symbol associated with the award animation sequence includes the first value-bearing symbol and any value-bearing symbols of the linked symbol group in a predetermined direction along the first reel strip.

18. The gaming system of claim 15, wherein the at least one value-bearing symbol associated with the award animation sequence includes value-bearing symbols of the linked symbol group presented above the first value-bearing symbol based on the respective positions of the value-bearing symbols.

19. The gaming system of claim 15, wherein the award region has a duration, and wherein the game-logic circuitry is configured to remove the award region in response to detecting expiration of the duration.

20. The gaming system of claim 19, wherein the duration of the award region is extended in response to at least one of additional activation events or linked symbol groups occupying the award region.

21. The gaming system of claim 15, wherein the game-logic circuitry is partially integrated within the gaming machine.

* * * * *